April 27, 1937.  E. C. BRISBANE  2,078,231
VALVE
Filed July 26, 1934  14 Sheets-Sheet 1
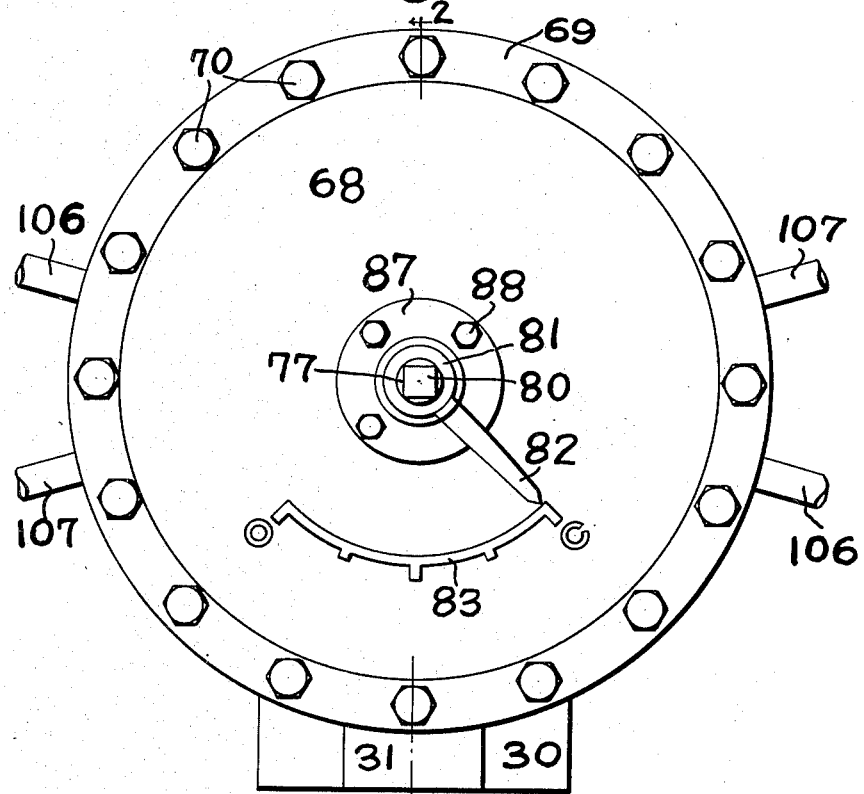
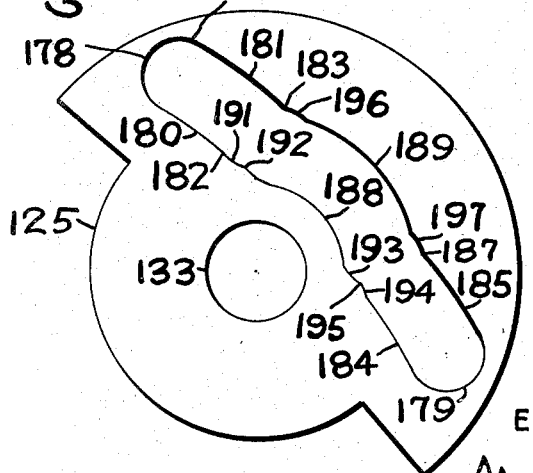
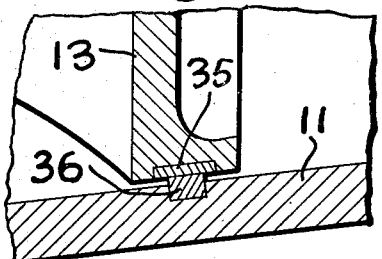
INVENTOR
EUGENE C. BRISBANE
BY Malcolm H. Bannett
ATTORNEY April 27, 1937.  E. C. BRISBANE  2,078,231
VALVE
Filed July 26, 1934  14 Sheets-Sheet 3
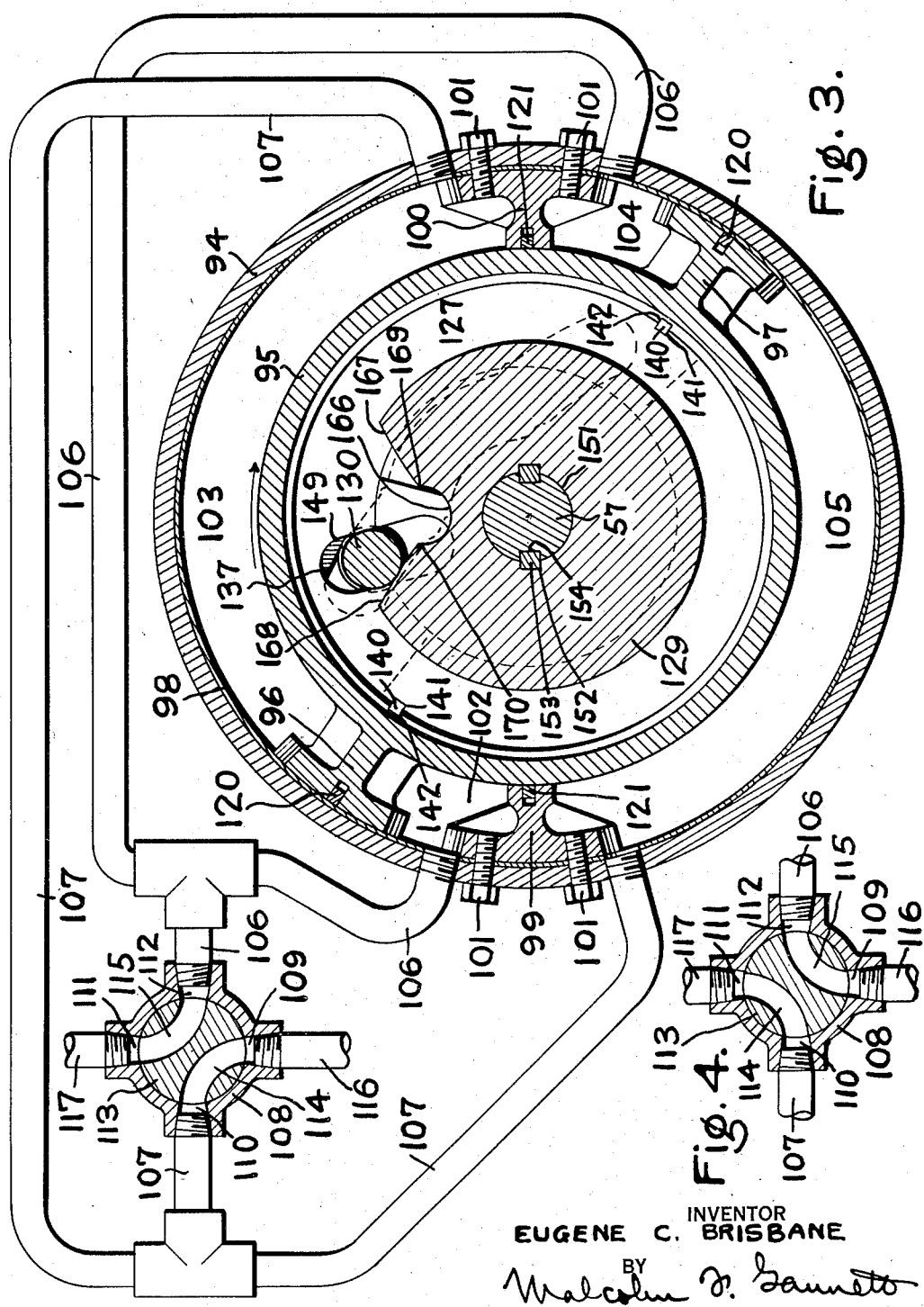
INVENTOR
EUGENE C. BRISBANE
BY
ATTORNEY April 27, 1937. E. C. BRISBANE 2,078,231
VALVE
Filed July 26, 1934 14 Sheets-Sheet 4

INVENTOR
EUGENE C. BRISBANE
BY
Malcolm F. Gannett
ATTORNEY

April 27, 1937.  E. C. BRISBANE  2,078,231
VALVE
Filed July 26, 1934   14 Sheets-Sheet 5

INVENTOR
EUGENE C. BRISBANE
BY
Malcolm F. Gannett
ATTORNEY

April 27, 1937.  E. C. BRISBANE  2,078,231
VALVE
Filed July 26, 1934   14 Sheets-Sheet 6
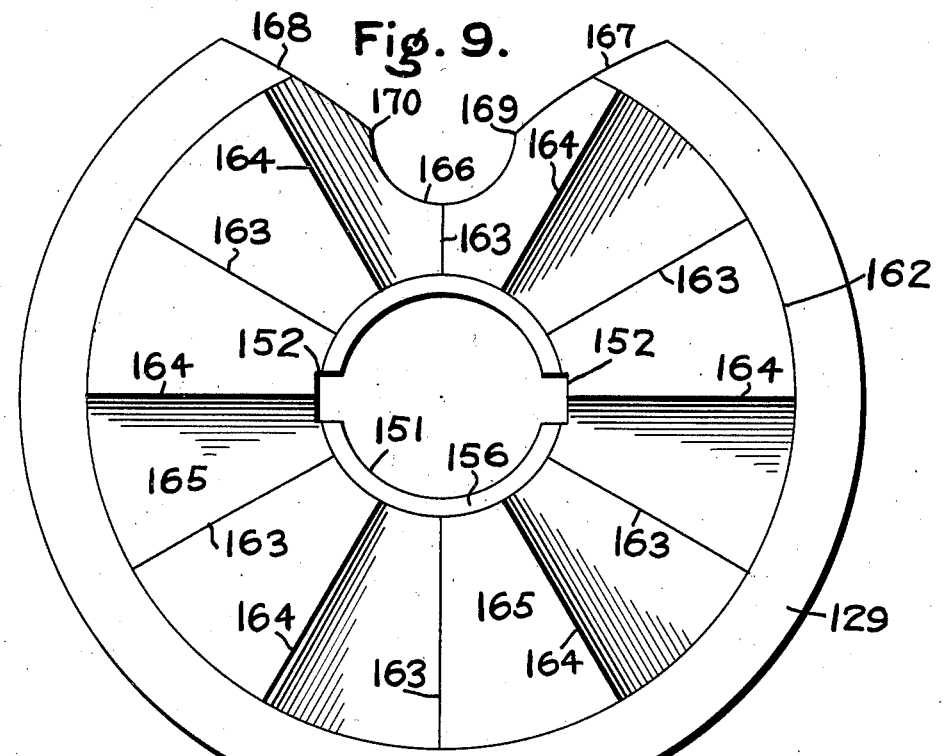
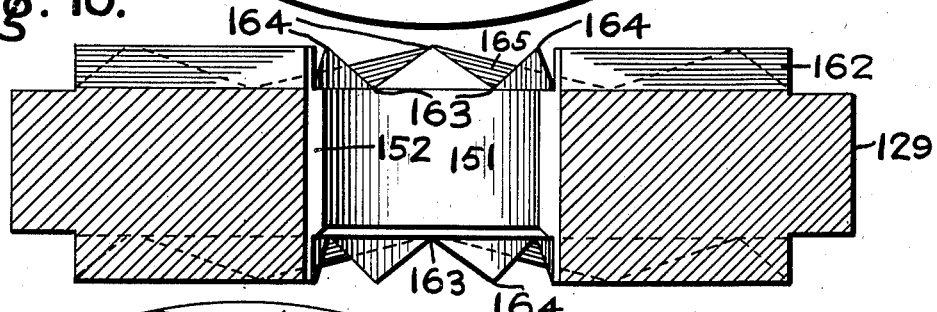
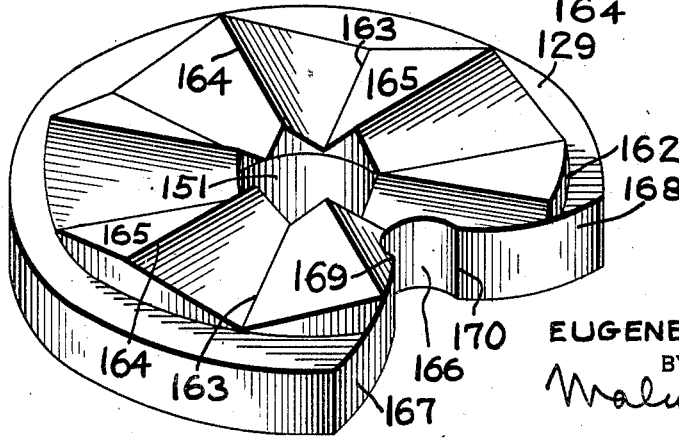
INVENTOR
EUGENE C. BRISBANE
BY
Malcolm J. Gannett
ATTORNEY April 27, 1937. E. C. BRISBANE 2,078,231
VALVE
Filed July 26, 1934 14 Sheets-Sheet 7
Fig. 12.
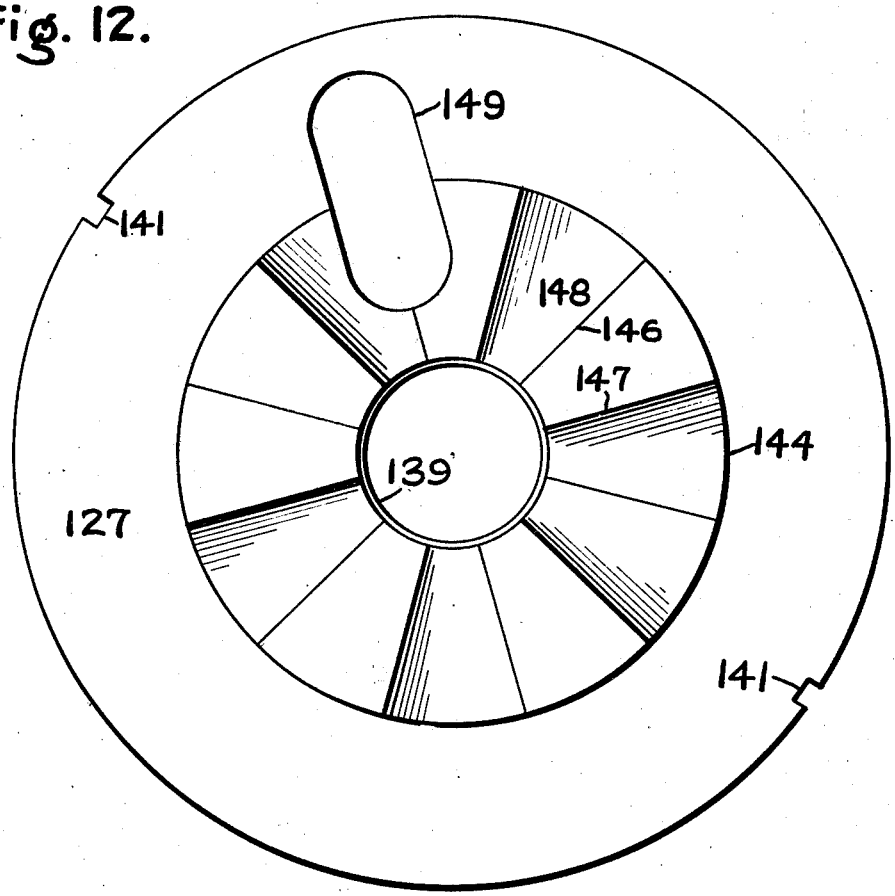
Fig. 13.
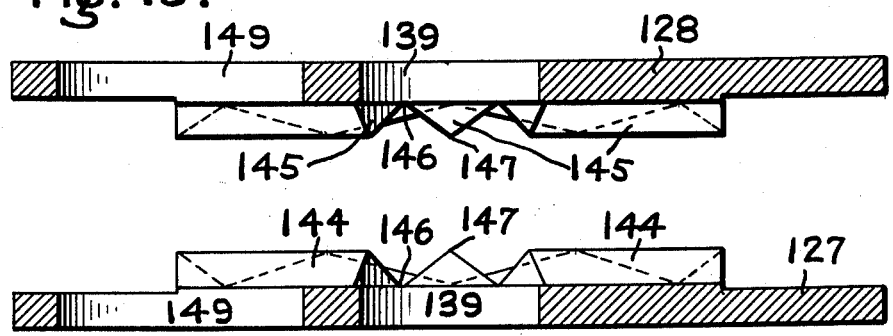
Fig. 14.
INVENTOR
EUGENE C. BRISBANE
BY
Malcolm F. Sannott
ATTORNEY April 27, 1937.  E. C. BRISBANE  2,078,231
VALVE
Filed July 26, 1934   14 Sheets—Sheet 8

INVENTOR
EUGENE C. BRISBANE
BY
ATTORNEY

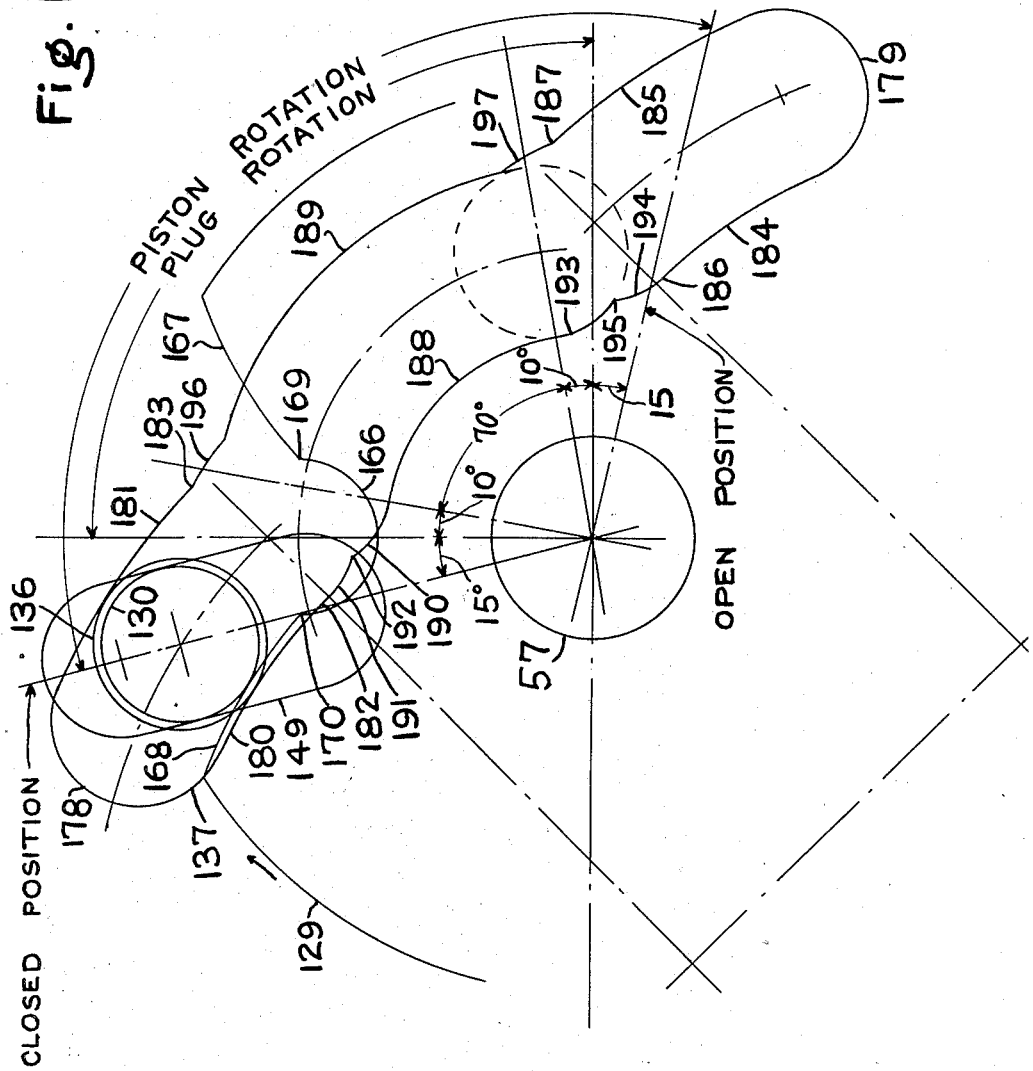

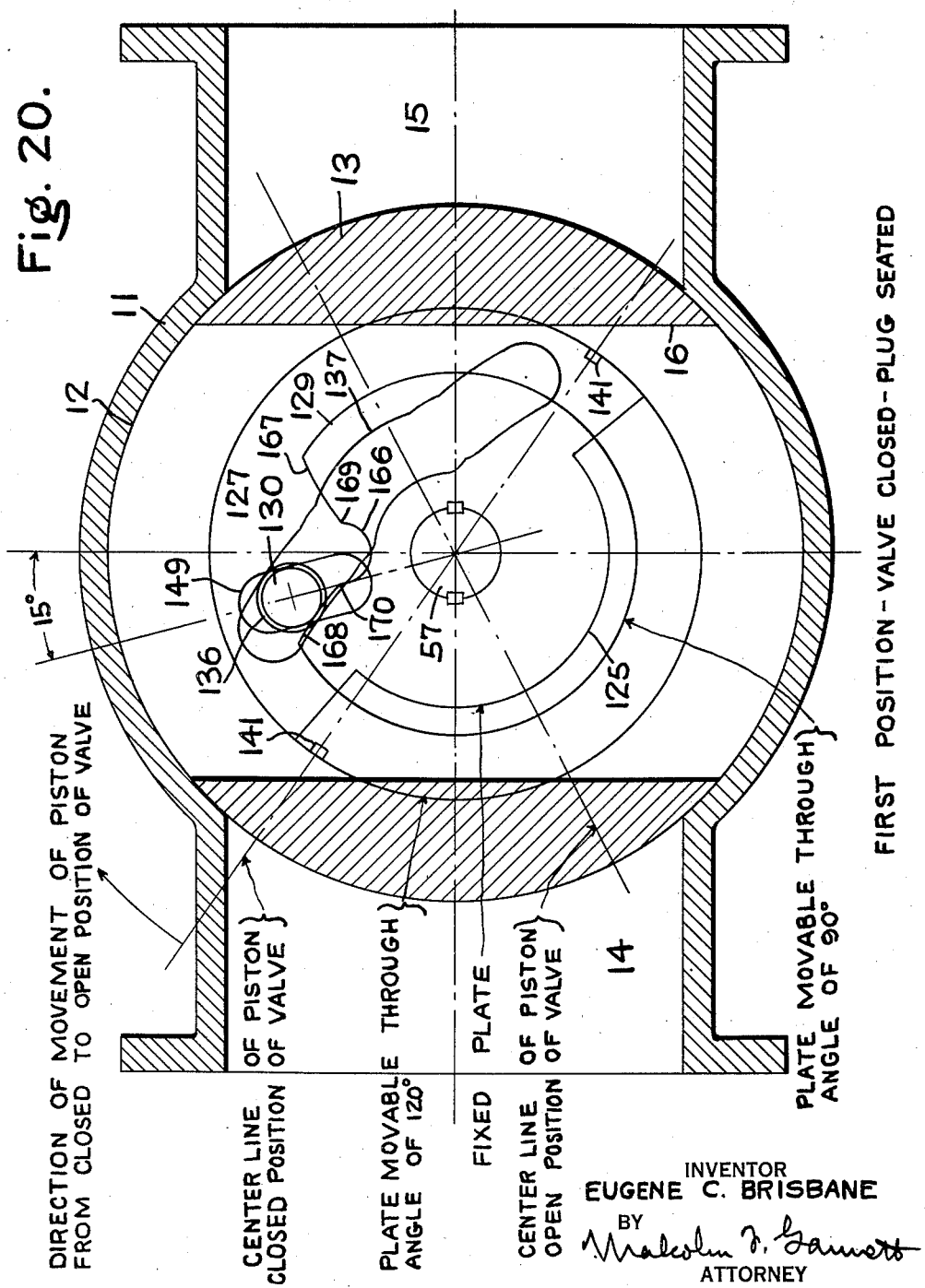

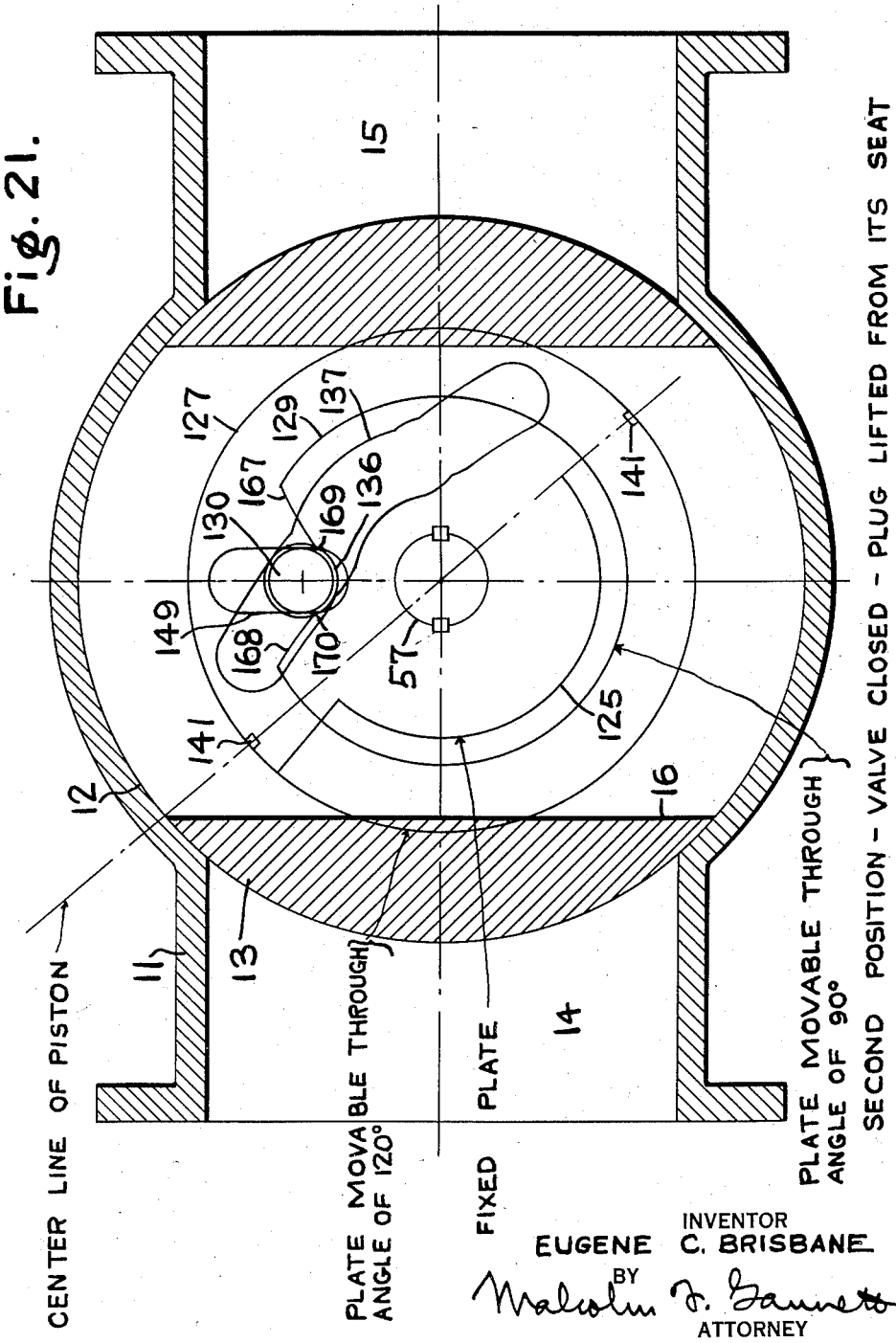

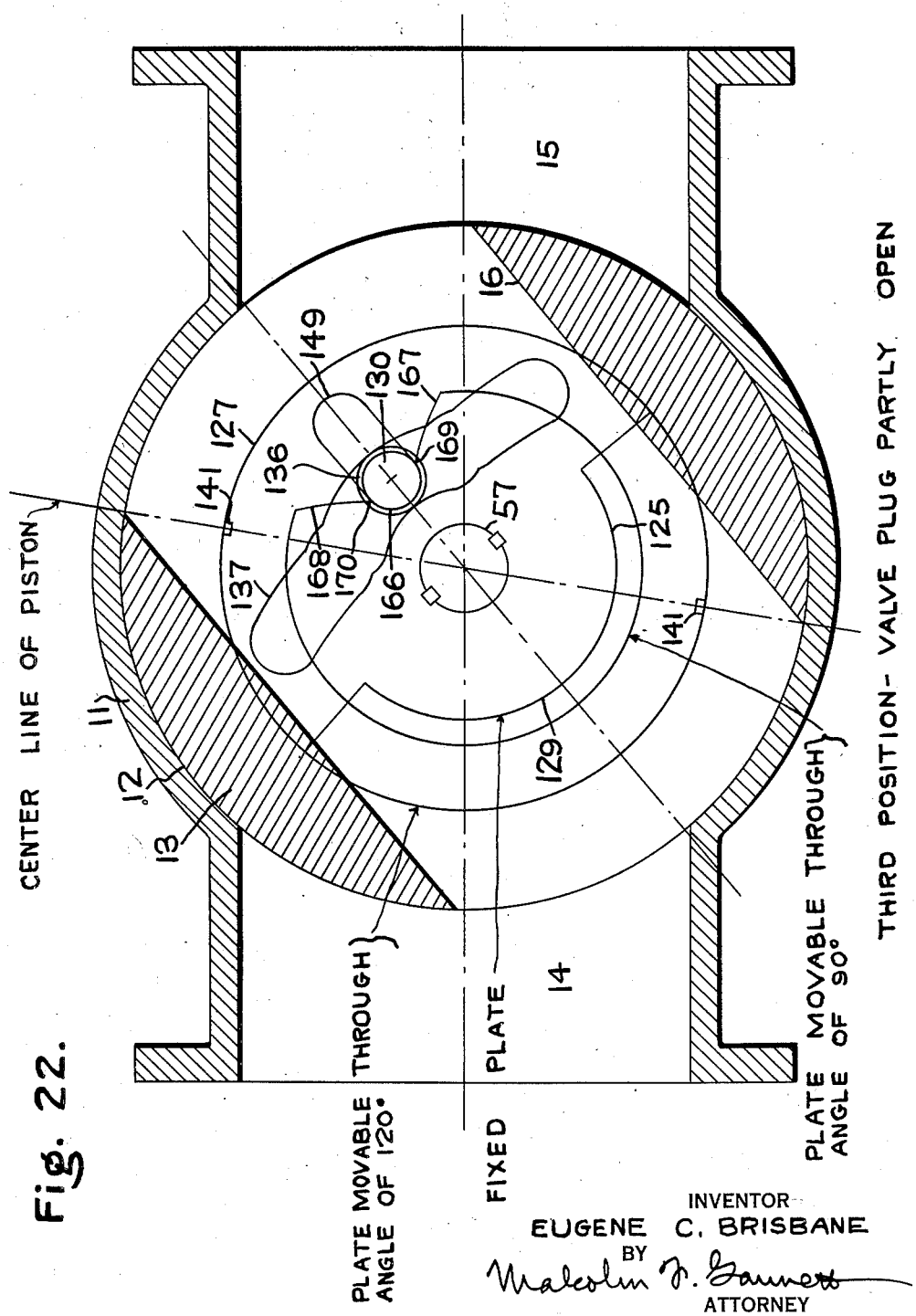

April 27, 1937.  E. C. BRISBANE  2,078,231
VALVE
Filed July 26, 1934   14 Sheets-Sheet 13

INVENTOR
EUGENE C. BRISBANE
BY
Malcolm F. Gannett
ATTORNEY

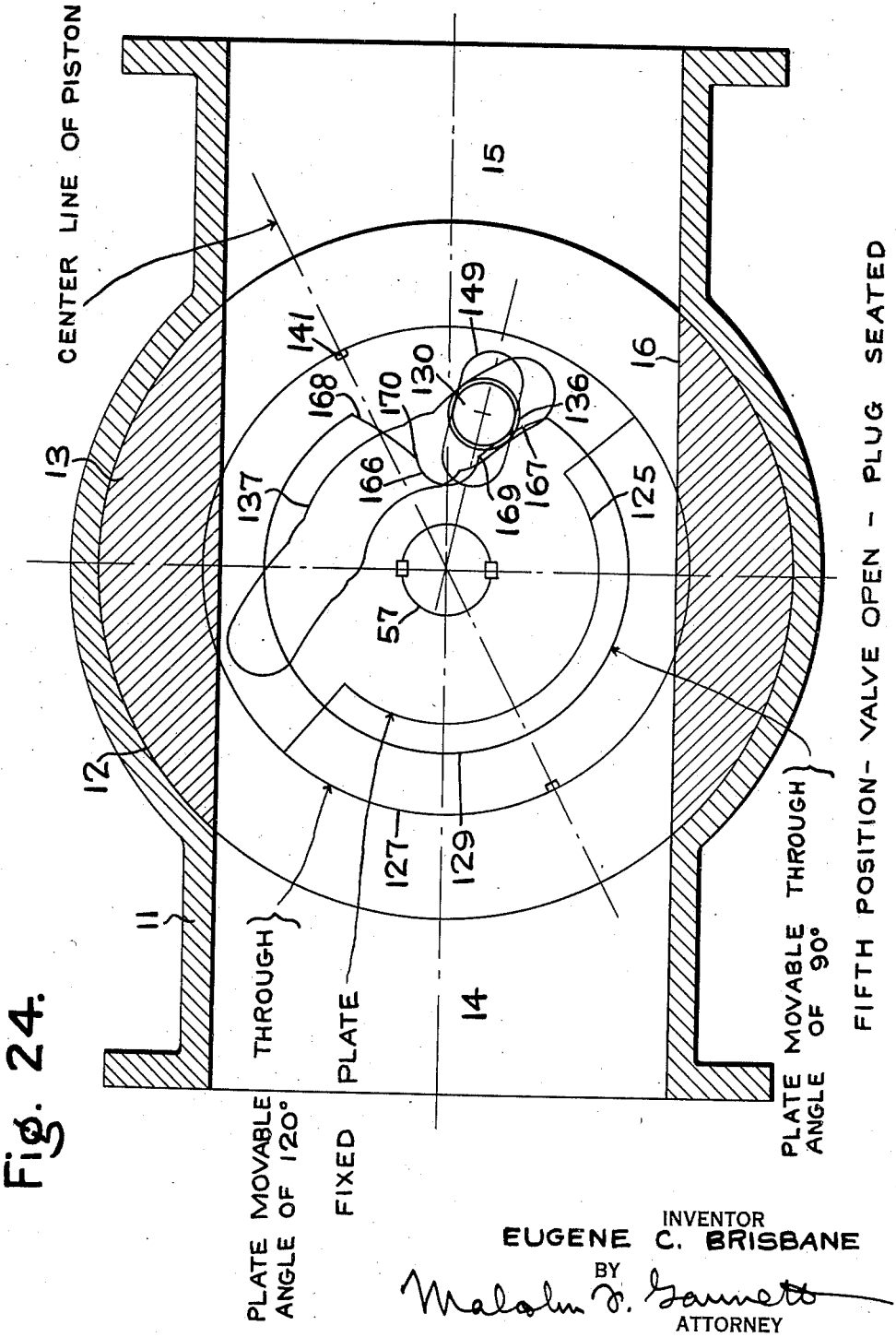

Patented Apr. 27, 1937

2,078,231

UNITED STATES PATENT OFFICE 2,078,231

VALVE

Eugene C. Brisbane, York, Pa., assignor to S. Morgan Smith Company, York, Pa., a corporation of Pennsylvania Application July 26, 1934, Serial No. 737,028

20 Claims. (Cl. 137—139)

This invention relates to valves, and more particularly to taper plug valves having power operated mechanism for operating the valve plugs.

An object of the invention is to provide an improved taper plug valve in which mechanism is provided for first raising the valve plug from its seat, then rotating the plug to open or to closed position, and thirdly, reseating the plug in either its open or closed position.

Another object of the invention is to provide an improved valve which can be used for all types of installation in connection with water, sewage, air, gas and oil pipe lines. By changing the controls for the valve operating mechanism, the improved valve may be used as a check valve, pressure regulating, pressure relief, altitude, float or stop valve.

Another object of the invention is to provide an improved valve by which the intensity of the water hammer in a pipe line is substantially reduced.

Another object of the invention is to provide an improved valve by which surging in the pipe line is substantially eliminated during opening and closing movements of the plug.

Another object of the invention is to provide an improved operating mechanism for valves of the above type.

Another object of the invention is to provide an improved valve in which the operating mechanism is entirely enclosed.

Another object of the invention is to provide an improved valve having a rotatable plug and actuating mechanism therefor which includes a rotatable fluid operated piston adapted to be rotated through an angle considerably greater than the turning angle of the plug, and means actuated by the piston for axially moving the plug in a straight line during the portions of the rotation of the piston in which the valve plug is not rotated.

Another object of the invention is to provide an improved valve having a rotatable tapered plug and actuating mechanism therefor which includes a rotatable fluid operated rotor adapted to be rotated through an angle considerably greater than the turning angle of the plug, the actuating mechanism also including cams actuated by the rotor and adapted to axially move the valve plug in a straight line during a predetermined period at the beginning and end of the rotation of the rotor to either unseat or reseat the plug, means for turning the plug through a predetermined angle, and means for operatively connecting the plug turning means with the cams during the intermediate period of rotation of the rotor.

Another object of the invention is to provide an improved valve having a rotatable plug and operating mechanism therefor including a rotor, means for rotating the rotor through an angle in excess of the turning angle of the plug, means for axially moving the plug in a straight line during a period at the beginning of the rotary movement of the rotor to unseat the plug and during a period at the end of the rotary movement of the rotor to reseat the plug, means for rotating the plug during the intermediate period of the rotary movement of the rotor, means for maintaining the plug rotating means uncoupled from the rotor during the periods the plug is moved axially in a straight line, and means for interlocking the plug rotating means with the plug axially moving means during the intermediate period of rotation of the rotor.

Another object of the invention is to provide an improved valve having a plug provided with a stem and operating mechanism including a rotor adapted to be rotated through an angle in excess of the turning angle of the valve plug, a cam plate fixed to the rotor and rotatable therewith, a cam plate fixed to the stem of the valve plug and normally disconnected from the rotor cam plate, a pin for interlocking the two cam plates together, and a fixed plate for guiding the pin so that the rotor cam plate will be uncoupled from the valve plug cam plate during periods at the beginning and end of the rotation of the rotor to permit the rotor cam plate to move relative to the plug cam plate to effect axial movement of the plug in a straight line and the rotor cam plate will be interlocked with the valve plug cam plate during the intermediate period of the rotation of the rotor so that both cam plates will rotate in unison to turn the valve plug therewith through a predetermined angle of rotation of the rotor.

Another object of the invention is to provide an improved valve structure in which the plug of the valve is operated by power means including a cylinder, a rotary piston in the cylinder, the piston being provided with a pair of diametrically disposed abutments, fixed abutments mounted in the cylinder and interposed between the piston abutments so as to provide a plurality of chambers, means connecting the alternate chambers in pairs, and means for controlling communication to said chambers, so that alternate chambers will be vented and alternate chambers will be supplied with fluid under pressure to rotate the piston through a predetermined angle in both directions.

Another object of the invention is to provide an improved valve of the character mentioned, which is simple in construction, and reliable and exact in function under all conditions of service.

The invention also comprises certain new and useful improvements in the construction, arrangement and combination of the several parts of which it is composed, as will be hereinafter more fully described and claimed.

In the accompanying drawings:—

Figure 1 is an end elevation of a valve constructed according to the present invention, the indicator arm attached to the plug stem being shown in closed position;

Fig. 3 is a transverse section taken on the line 3—3 of Fig. 2 showing the piston and the parts associated therewith, the valve for controlling the supply of fluid to the piston chambers being shown in the position in which the plug remains in closed position;

Fig. 4 is a detail section of the control valve shown in Fig. 3, showing the same in the position in which fluid is supplied to the piston for moving the plug to open position;

Fig. 9 is a plan of the shaft cam plate of the plug operating mechanism;

Fig. 10 is a section through the shaft cam plate shown in Fig. 9;

Fig. 11 is a perspective of the shaft cam plate;

Fig. 12 is a plan of one of the cam plates carried by the piston;

Fig. 13 is a section of the upper cam plate carried by the piston;

Fig. 14 is a section of the lower cam plate carried by the piston;

Fig. 15 is a detail plan of one of the pin guide plates;

Fig. 19 is a diagrammatic view of the pin escapement of the plug operating mechanism;

Fig. 20 is a section through the valve taken on the line 20—20 of Fig. 2 showing diagrammatically therewith the pin escapement and parts associated therewith in their relative positions when the valve is closed and the plug is seated;

Fig. 21 is a diagrammatic view similar to Fig. 20 showing the position of the parts when the valve is closed and the plug is lifted from its seat preparatory to being rotated towards open position;

Fig. 22 is a diagrammatic view similar to Fig. 20 showing the position of the parts when the valve plug is partly opened;

Fig. 24 is a diagrammatic view similar to Fig. 20 showing the position of the parts when the valve is open and the plug is seated; and Fig. 25 is an enlarged section of one of the sealing means of the valve plug.

Figure 2:
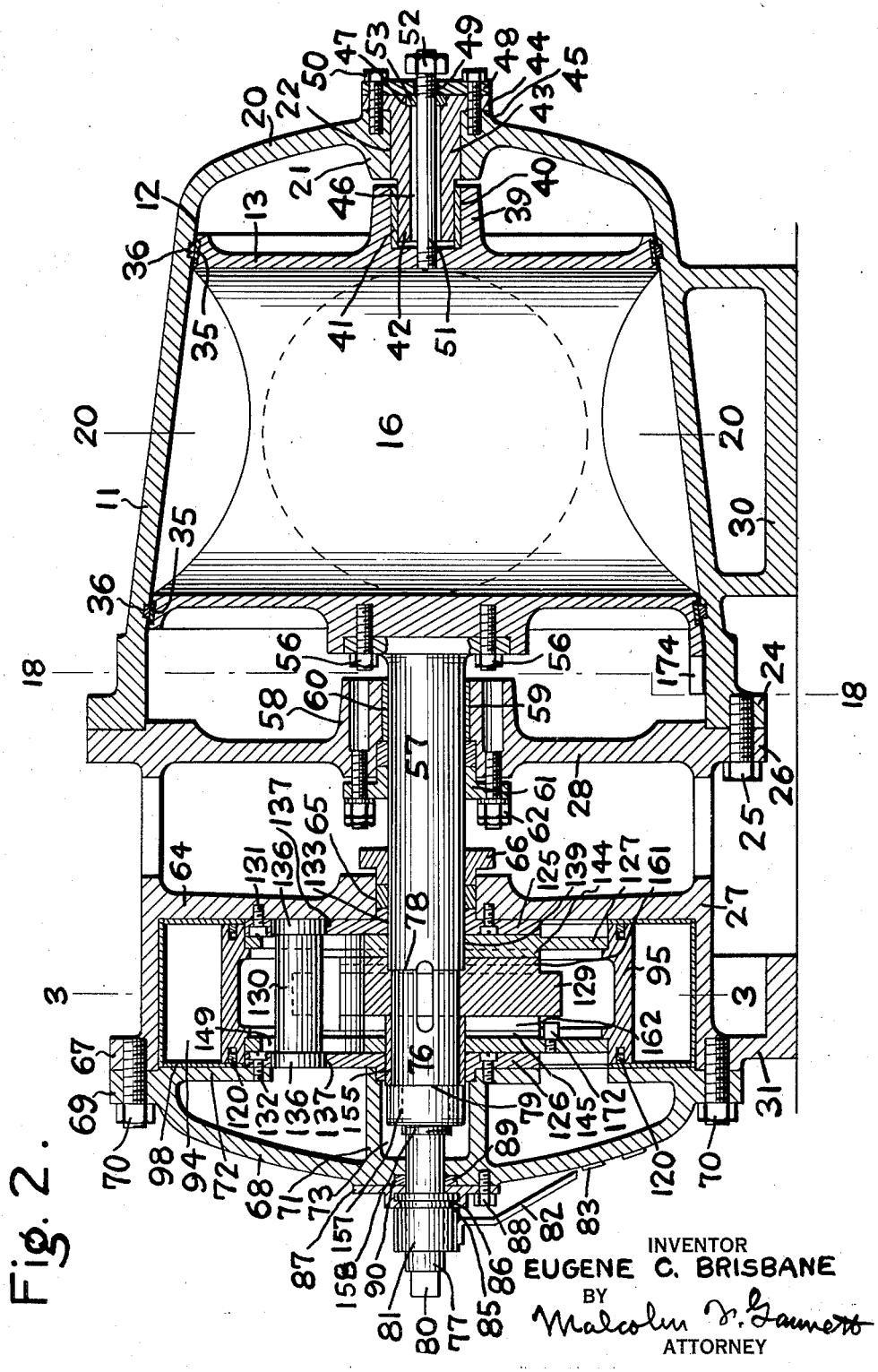
Fig. 2 is a longitudinal section taken on the line 2—2 of Fig. 1, the plug being shown in closed position.

The drawings illustrate a straight-way valve, but the improvements are equally applicable to three or four way, elbow and angle valves.

Referring to the drawings, the improved valve comprises a main body or casing 11 having a cavity 12 formed therein for a tapered plug 13, the cavity 12 being intersected by a longitudinal waterway or opening which constitutes passages 14, 15 through the valve, the passage 14 being on one side of the cavity 12 and the passage 15 being on the other side of said cavity, as shown in Figs. 20–24 inclusive.

The plug 13 also has a passage 16 formed therein. The passages 14, 15 and 16 are round, and all are of substantially the same diameter, so that when the plug 13 is in the open position shown in Fig. 24, a uniform bore will extend through the valve from end to end. In this way a flush passage way is formed throughout the length of the valve equal to the full area of the pipe connection. This is important, since in any pumping installation the loss of head resulting from constricting the passageway through a valve increases the cost of power.

The casing 11 of the valve is preferably constructed from a single casting having a tapered side wall, as shown in Fig. 2. The smaller end of the casing 11 is rounded, as indicated at 20. A boss 21 is formed centrally in the smaller end of the casing 11, said boss having an opening 22 formed therein for a purpose to be hereinafter more fully described.

The larger end of the casing 11 is formed with an outwardly projecting flange 24 which has secured thereto by any suitable means, such as bolts 25, one of which is shown in Fig. 2, a correspondingly formed flange 26 of the housing 27 of the operating mechanism of the valve. The housing 27, adjacent to the flange 26, is formed with a web 28 which constitutes a cover plate for closing the larger end of the cavity 12 of the valve body 11.

In the embodiment of the invention herein shown and described the valve is adapted to be positioned with the axis of rotation of the plug 13 disposed in a horizontal plane (see Fig. 2). In order to support the valve in such position the casing 11 and housing 27 are respectively formed with extensions 30, 31 which are adapted to rest on a suitable foundation or other supporting base or means, to thereby support the valve. The extensions 30, 31 may, if so desired, be cast integral with the casing 11 and housing 27, respectively, as shown in Fig. 2.

The valve plug 13 is equipped with seat rings 35 which are adapted to engage seat rings 36 mounted in the casing 11 (see Figs. 2 and 25).

The seat rings 35, 36 are formed from suitable wear-resisting material, such as brass, bronze, or other non-corrosive composition metal, so as to enable the plug 13 to be tightly and firmly seated in the casing.

With the plug 13 unseated, as will be hereinafter more fully described, the clearance between the plug and body seats is enough to permit easy rotation of the plug, but not enough to permit foreign matter to pass the seats and enter the valve body.

The plug 13 being conical and the inside of the body 11 also being conical, they form essentially a surface of revolution within a surface of revolution.

The plug 13 is wedged into the body 11 when in the closed position with the plug seat rings 35 face to face with the seat rings 36 in the body, as clearly shown in Fig. 25.

The seat rings 35, 36 are set back from the line of flow through the valve and the seat rings 36 are also raised from the body. The seat rings 35 on the plug are substantially flush with the surface of the plug 13. As shown in Fig. 25, the seat rings 35 are wider than the seat rings 36, so as to provide a broad surface for the seat rings 36 to bear against and permit slight variation in the relative seating position of the plug in the casing. This construction of the seat rings prevents scoring or wire drawing and provides a tight seal for the plug 13 in the valve body. Also, by forming the seat rings in this manner the plug will always find its seat and no adjustment will be necessary as the result of normal wear of the seat rings over a long period of time.

The tapered plug 13 is supported for both axial and rotary movement in the casing.

At its lower or smaller end, the plug 13 is formed with an extension which constitutes a trunnion 39. The trunnion 39 is formed with an opening 40 of suitable diameter which extends inwardly from the outer end portion of the trunnion a suitable distance.

Disposed in the opening 40 is a bushing 41, which forms a bearing for the reduced end portion 42 of a stem or spindle 43 mounted in the opening 22 heretofore referred to. The stem or spindle 43 is formed with an outwardly projecting flange 44 which bears against a correspondingly formed surface 45 on the end 20 of the casing 11. The stem or spindle 43 is formed with a through bore 46, said bore being enlarged at its outer end, as at 47 Fig. 2, for a purpose to be hereinafter described.

Mounted on the flanged portion 44 of the stem or spindle 43, is a disc 48 having an opening 49 formed centrally therein.

The stem or spindle 43 and the disc 48 are detachably secured to the end 20 of the casing 11 by means of machine screws 50.

A rod 51 having its inner threaded end mounted in the plug 13, extends through the opening 49 of the disc 48 and the bore 46 of the stem or spindle 43. The outer end of the rod 51 is threaded for the reception of a nut 52.

A suitable packing 53 is mounted in the enlarged portion 47 of the bore 46 of the stem or spindle 43 and surrounds the rod 51, so as to prevent leakage of fluid around said rod.

When the plug 13 is seated in the casing, the nut 52 is disposed away from the disc 48, as shown in Fig. 2, so as to permit axial movement of the plug with respect to the casing for a purpose to be hereinafter more fully described.

When it is desired to remove the housing 27 and the mechanism contained therein from the main valve casing 11, the nut 52 is turned down tightly against the disc 48. This action will draw the tapered plug 13 downwardly in the casing and thereby seal the plug within the casing so as to prevent loss of fluid therefrom while the housing 27 and the parts therein are removed from the casing. After the housing 27 has been again assembled on the main valve casing 11, the nut 52 is unscrewed sufficiently to permit free axial movement of the plug 13.

Projecting from the top of the plug 13 and detachably secured to said plug by bolts or the like 56, is the main shaft or stem 57 of the valve.

The web 28 of the housing 27 heretofore referred to, is formed with a boss 58 having an opening 59 therein in which is mounted a bushing 60. The valve stem 57 passes through the opening 59, and the bushing 60 constitutes the main bearing for the valve stem.

A packing gland 61, fastened to the outer side of the web 28 by bolts or the like 62, prevents leakage of fluid around the valve stem.

At a suitable distance beyond the web 28, the housing 27 is formed with a second web 64, having an opening 65 formed centrally therein through which the valve stem 57 extends. Leakage of fluid around the valve stem 57 at this point is prevented by a packing gland 66.

The outer end of the housing 27 is formed with an outwardly projecting flange 67.

A cover 68, having a flange 69 engaging the flange 67 of the housing 27, is detachably secured to said housing by a plurality of bolts 70 (see Figs. 1 and 2). The cover 68 is dome-shaped as shown best in Fig. 2.

Formed integrally with the cover 68 is a central inwardly projecting boss 71. A web 72 projects inwardly from the flanged portion of the cover and forms between it and the web 64, a chamber in which is disposed the operating mechanism of the valve. The boss 71 is formed with a comparatively large opening 73, and an opening 74 is formed centrally in the dome-shaped wall of the cover 68, through which the valve stem 57 extends.

Figure 7:
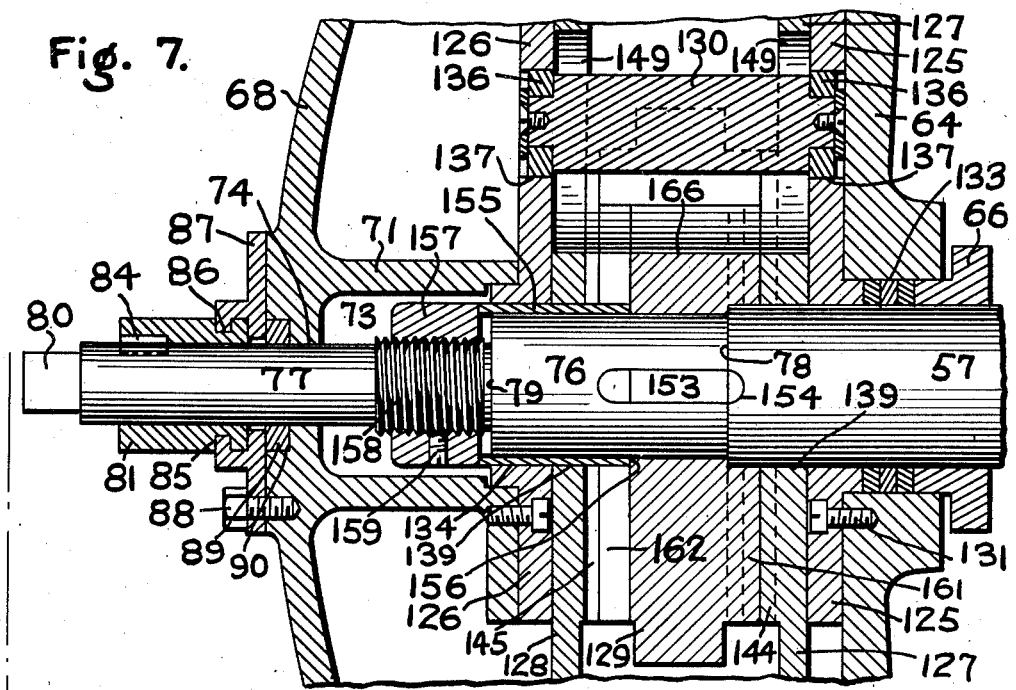
Fig. 7 is an enlarged section of a portion of the plug operating mechanism, the parts being shown in the position in which the plug is closed.
Figure 8:
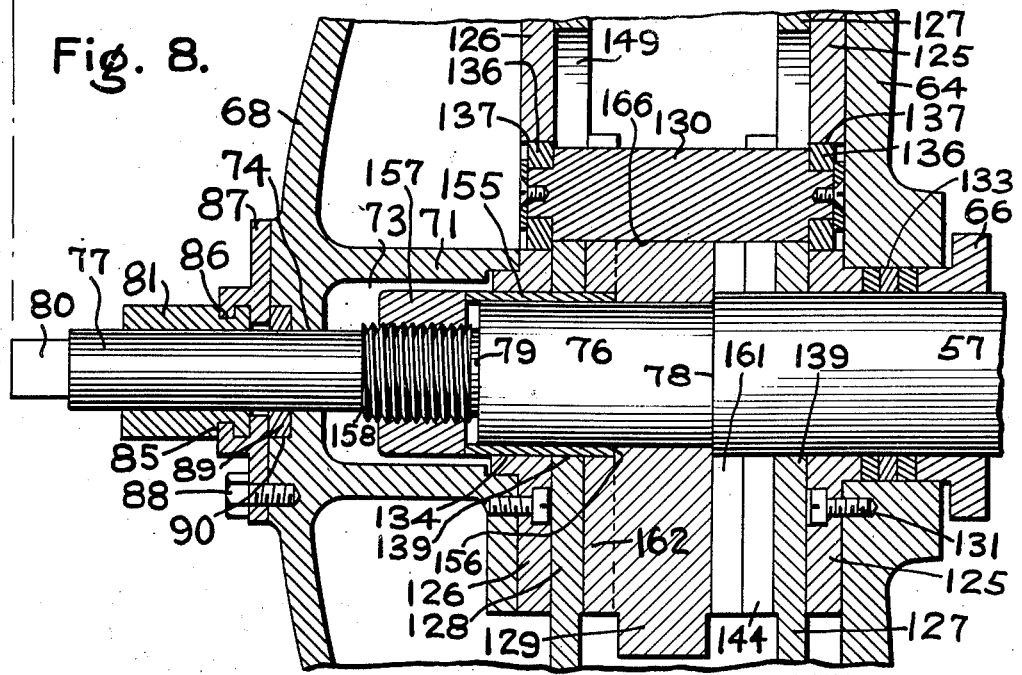
Fig. 8 is a view similar to Fig. 7 showing the position of the parts when the plug is unseated and being rotated towards open position.

As shown in Figs. 2, 7 and 8, the valve stem 57 is formed with various diameters which successively decrease in size outwardly from the plug 13. In the drawings the main portion of the valve stem is designated by reference character 57, the next smaller or intermediate section of the valve stem being indicated at 76, and the third or outer portion of the stem being indicated by the reference numeral 77. Between the portions 57 and 76 of the valve stem, there is a shoulder 78, and between the portions 76 and 77, there is a shoulder 79. The extremity of the valve stem is formed with a rectangular portion 80, and if so desired a wrench or other tool may be applied thereto in order to turn the stem and the plug 13 attached thereto.

Mounted on the outer end portion 77 of the valve stem, is a collar 81 carrying an indicator arm 82 for indicating the position of the valve plug 13, as denoted by graduations 83 formed on the cover 68, as shown in Fig. 1. The letter "C" of such graduations indicates the closed position of the plug, and letter "O" indicates the open position. As shown in Fig. 7 the collar 81 is keyed to the valve stem, as at 84, so that said collar will rotate with said stem when the latter rotates.

However, in order to prevent axial movement of the collar 81 relative to the cover 68 of the valve, the inner portion of the collar is formed with a groove 85 in which is mounted a tongue or rib 86 formed on a plate 87 detachably secured to the cover 68 by bolts 88, as shown in Figs. 1, 2, 7, and 8. In order to prevent leakage of fluid around the valve stem at this point a packing 89 is disposed in a recess 90 formed in the cover 68, said packing being retained in said recess by the plate 87.

In the present embodiment of the invention the valve operating means is shown as comprising a fluid operated rotor or piston 95 and mechanism operated by said piston. The piston 95 is rotatably mounted in a suitable cylinder 94 formed in the housing 27.

Figure 5:
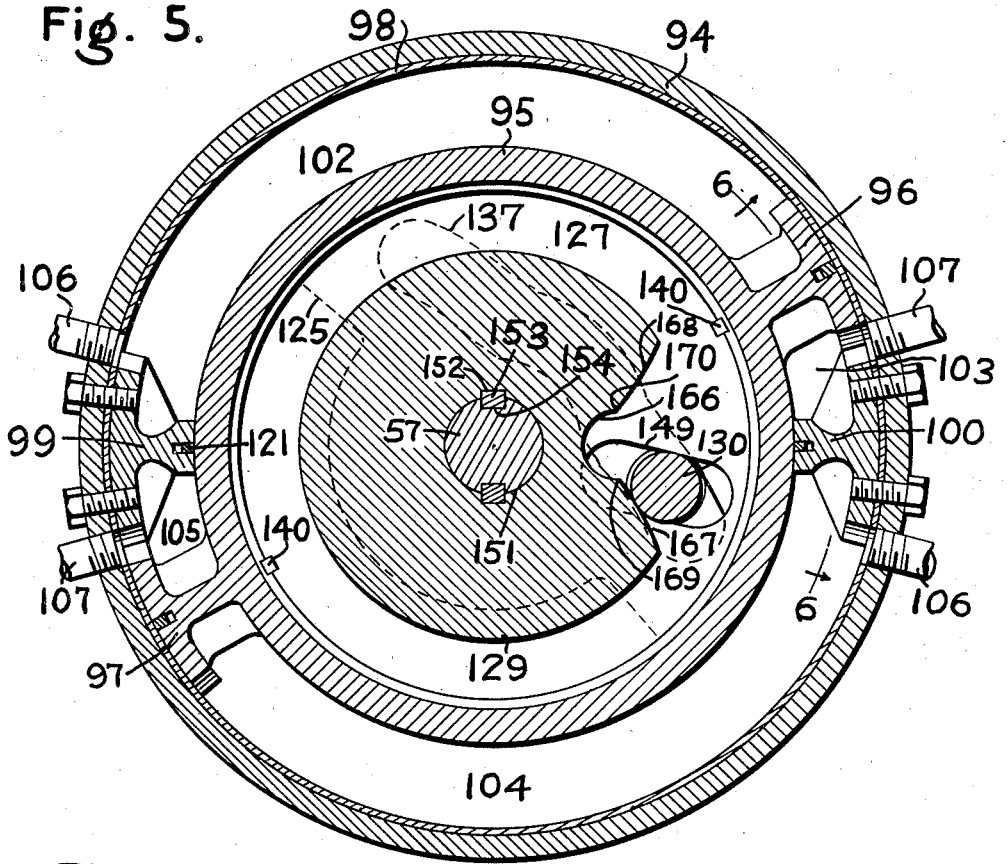
Fig. 5 is a section similar to Fig. 3 showing the piston and associated parts in the position in which the plug is open.

As shown in Figs. 2, 3, and 5 the piston 95 comprises a main body portion, annular in form, and a pair of diametrically disposed arms or blades 96, 97 which project outwardly from the annular body portion of the piston. The arms 96, 97 constitute movable abutments, the purpose of which will be hereinafter more fully described.

The valve stem 57 extends through the central portion of the piston 95 and carried by the valve stem and also by the piston, are parts of the operating mechanism, as will be hereinafter more fully described.

As shown in Fig. 3, the diameter of the main body portion of piston 95 is less than the diameter of the cylinder 94, and the walls of the cylinder 94 which enclose the piston are lined with thin sheets of suitable wear resisting material, as indicated at 98 (see also Fig. 2.)

Figure 6:
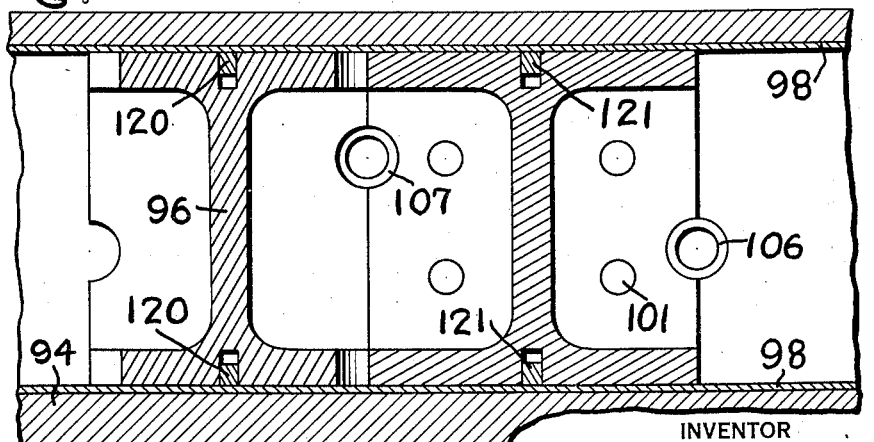
Fig. 6 is a section taken on the line 6—6 of Fig. 5.

Disposed in the space between the side wall of the cylinder 94 and the main annular body portion of piston 95 and arranged diametrically to each other, are spacer blocks or arms 99 and 100. These members are carried by the wall of the cylinder 94, being secured thereto by bolts, or the like 101, as shown in Figs. 3, 5 and 6. The spacer blocks or arms 99 and 100 constitute fixed abutments, which together with the arms or wings 96 and 97 of the piston 95 form chambers 102, 103, 104 and 105.

In Fig. 3 piston 95 is shown in the position in which valve plug 13 is closed, (see also Figs. 2 and 20), and in Fig. 5 piston 95 is shown in the position in which valve plug 13 is open (see also Fig. 24).

In order to rotate the piston 95, fluid under pressure from any suitable source of supply may be used. The valve in actual practice, when installed in a water pipe line, has been actuated by water under pressure, obtained either from the pipe line to which the valve is connected, or to a separate source of supply.

Any suitable means may be employed for supplying fluid under pressure to the valve for the purpose of operating piston 95, and any suitable means, either manually or automatically operated, may be employed for controlling the supply of fluid under pressure to the piston chambers of the valve.

In the embodiment of the invention herein shown and described, chamber 102 is connected to chamber 104 by a pipe or conduit 106, and chambers 103 and 105 are connected by a pipe or conduit 107.

For the purpose of controlling communication through the pipes 106 and 107, a valve device 108 may be employed.

As shown in Figs. 3 and 4, the valve device 108 has four parts 109, 110, 111 and 112, and a movable plug 113, said plug being formed with passages or waterways 114 and 115.

Pipe 106 heretofore referred to is connected to port 112, and pipe 107 is connected to port 110. Port 109 is connected by a pipe 116 to a supply of fluid under pressure (not shown), and port 111 is connected by a pipe 117 to a sewer, or other discharge or vent means (not shown).

In the position of piston 95 shown in Fig. 3, chambers 102 and 104 are vented or connected to the sewer (not shown) since the waterway or passage 115 of valve 108 connects ports 111 and 112. Also fluid under pressure is supplied to piston chambers 103 and 105, by reason of the fact that said chambers are connected with the supply of fluid under pressure through pipe 107, port 110, waterway or passage 114 in the plug of valve 108 and pipe 116.

With the control valve device 108 positioned as shown in Fig. 3, the valve plug 13 will be retained in closed position (see also Figs. 2 and 20) and when it is desired to open the valve plug 13, control valve device 108 is operated to move the plug 113 thereof from the position shown in Fig. 3 to the position shown in Fig. 4. In the latter position fluid under pressure will be supplied to piston chambers 102 and 104 from the source of supply (not shown), through pipe 116, port 109, waterway or passage 115, port 112 and pipe 106, and piston chambers 103 and 105 will be connected to the sewer, through pipe 107, port 110, waterway or passage 114, port 111 and pipe 117.

The admission of fluid under pressure into chambers 102 and 104 and the simultaneous venting of chambers 103 and 105 as above described, effects rotation of the piston 95 from the position shown in Fig. 3 to the position shown in Fig. 5, said rotation, in the present instance being through an arc of approximately 120°.

In order to prevent leakage of fluid from the piston chambers 102, 103, 104 and 105, the arms 96 and 97 of the piston 95 are provided with suitable packing or sealing means 120, and the spacer blocks 99 and 100 are provided with similar packing or sealing means 121 (see Figs. 2, 3, 5 and 6).

The operating mechanism for the valve plug 13 is disposed within the annular body portion of the piston 95.

Referring now to Figs. 2, 3, 5, 7, 8, 9, 10, 11, 12, 13, 14 and 15, the valve operating mechanism is shown as comprising a pair of fixed plates 125, 126, a pair of movable plates 127, 128, a single plate 129, and a pin 130 operatively associated with all of said plates in the manner to be hereinafter more fully described.

As shown in Figs. 2, 7, 8 and 15, plates 125 and 126 are similar in form and construction. If so desired these plates may be circular in outline, but in order to reduce the weight thereof, in large sizes of valves the plates may be shaped as shown in Fig. 15, with a portion of their area reduced.

Plate 125 is secured to the web 64 of the housing 27 by screws 131, and plate 126 is secured to the web 72 of cover 68 by screws 132 (see Figs. 2, 7 and 8). The plates 125 and 126 are respectively formed with substantially central openings 133, 134 through which the valve stem 57 extends.

The pin 130 is composed of a main cylindrical body portion on the opposite ends of which rollers 136 are rotatably mounted, said rollers being slightly larger in diameter than the main body of the pin, as shown in the drawings (see particularly Figs. 7 and 19).

The plates 125 and 126 have correspondingly formed openings 137 therein in which the rollers 136 of the pin 130 are disposed. The openings 137 provide means for guiding the pin 130 and the contour of said openings are shaped in a manner to be hereinafter described so that the pin 130 will be caused to travel in a predetermined path during operation of the mechanism.

As shown in Figs. 12, 13 and 14, the movable plates 127 and 128 each comprise a circular disc having an opening 139 formed centrally therein through which the valve stem 57 extends. These plates are connected to the piston 95 by keys 140 which are disposed in diametrically disposed notches 141, 142, respectively, formed in the peripheries of said plates and the adjacent wall of the piston 95, as shown in Fig. 3.

As shown in Figs. 2, 7 and 8, plate 127 has a surface which lies flush against the adjacent face of the fixed plate 125 heretofore referred to, and plate 128 has a surface which lies flush against the adjacent face of fixed plate 126. The opposite surface of plate 127 is formed with a series of upwardly projecting serrations or teeth 144, and plate 128 also is formed with a series of similarly formed serrations or teeth 145, (see Figs. 12, 13 and 14). The plates 127 and 128 are so mounted that the serrations 144 and 145 project towards each other (see Figs. 13, 14, 16 and 17).

In the present instance the serrations 144 and 145 are radially disposed, each having a radially disposed valley or low portion 146 and a radially disposed ridge or high portion 147. As shown in Fig. 12 there are six valleys 146 and six ridges 147, the valleys 146 being located 60° apart and the ridges 147 also being located 60° apart around the surfaces of the plates. The valleys 146 and ridges 147 are alternately disposed and between each valley 146 and ridge 147 there is an inclined surface 148, the purpose of which will be hereinafter more fully described.

An elongated opening or slot 149 is formed in each plate 127 and 128. The openings 149 are radially disposed and have a width corresponding substantially to the thickness of the main body portion of the pin 130 and a suitable length to permit movement of the pin 130 in said slots from a point near the center of the plates 127 and 128 to a point near the outer edges or peripheries of said plates. As shown in Fig. 12 the longitudinal center lines of the openings or slots 149 are disposed coincident with one of the valleys 146 heretofore referred to. When the parts are assembled in the valve and the valve plug 13 is in closed position, the slots 149 of the plates 127 and 128 overlie one another and the center lines of the slots are located approximately 15° to the left of the vertical line shown in Figs. 19 and 20, in which position the plates 127 and 128 will be oriented slightly for a purpose to be hereinafter more fully described, and the slots 149 will intersect and cross the openings 137 in the fixed plates 125 and 126.

Referring to Figs. 2, 3, 5, 7–11, 16, 17 and 20–24, the plate 129 comprises an annular body portion having a central opening 151 formed therein so that said plate can be mounted on the portion 76 of valve stem 57. In order to key said plate to said valve stem, the plate is formed with grooves or recesses 152 (see Figs. 3, 5 and 9). The valve stem 57 is likewise formed with grooves or recesses 154, and keys 153 are mounted in the grooves or recesses 152 and 154.

For the purpose of preventing rectilinear movement of plate 129 with respect to the valve stem 57, a sleeve 155 is utilized. The sleeve 155 is fitted on to the reduced portion 76 of the valve stem, one end of said sleeve bearing against a shoulder 156 formed in the plate 129 around opening 151, as shown in Fig. 7. The sleeve 155 is held in position by means of a nut or collar 157 which is mounted on a threaded portion 158 of the section 77 of valve stem 57. The nut or collar 157 is disposed in opening 73 heretofore referred to. The external diameter of sleeve 155 is approximately the same as the diameter of the main portion of valve stem 57 and said sleeve neatly fits the openings 134 and 139 of plates 126 and 128, respectively. The sleeve 155 constitutes the third bearing for the valve stem 57. When the parts are assembled, nut or collar 157 is screwed down tight and this action forces the opposite end of sleeve 155 against the shoulder 156 of plate 129 so that said plate is forced tightly against shoulder 78 between portion 76 and the main portion of valve stem 57. In this way plate 129 is clamped tightly between valve stem shoulder 78 and the inner end of the sleeve 155 and consequently rectilinear movement of plate 129 in either direction will effect a corresponding movement of valve stem 57 for a purpose to be hereinafter described. Nut or collar 157 is locked in position by means of a set screw 159 (see Fig. 7).

Figure 16:
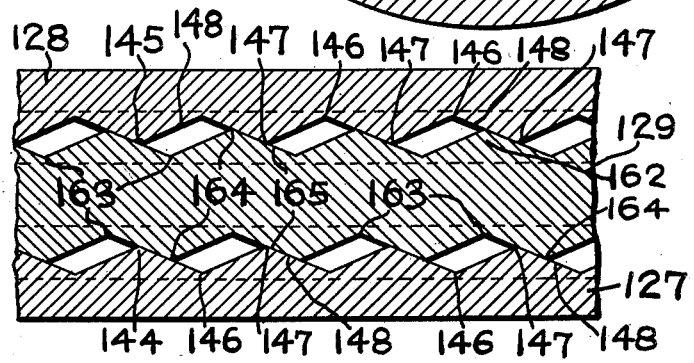
Fig. 16 is a diagrammatic section showing the relative positions of the shaft cam plate and the upper and lower piston cam plates when the valve plug is seated.
Figure 17:
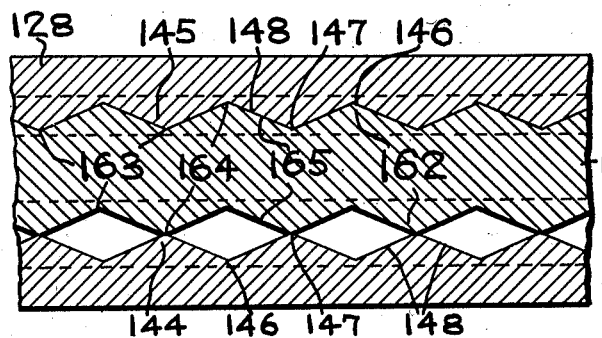
Fig. 17 is a view similar to Fig. 16 showing the position of the shaft cam plate and the upper and lower piston cam plates when the valve plug is unseated.
Figure 23:
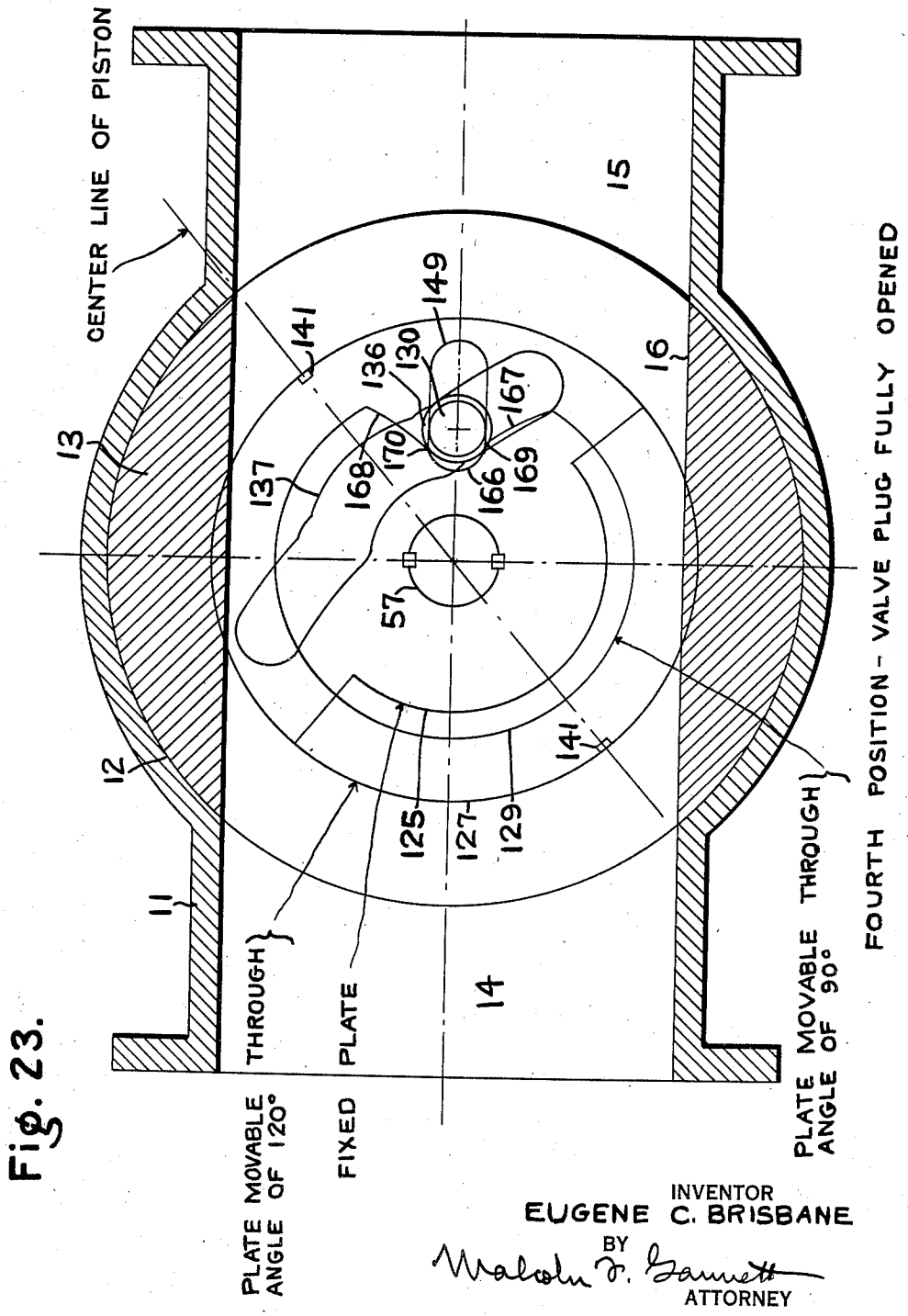
Fig. 23 is a diagrammatic view similar to Fig. 20 showing the position of the parts when the valve plug has been rotated to its fully open position.

Plate 129 is somewhat thicker than plates 125, 126, 127 and 128 heretofore described, and both sides of plate 129 are formed with serrations or teeth, the inner side of said plate having serrations 161 thereon for engaging the serrations 144 of plate 127, and the outer side of plate 129 having serrations 162 thereon for engaging the serrations 145 of plate 128 (see Figs. 16 and 17).

As shown in Figs. 9, 10 and 11 the serrations 161 and 162 are radially disposed, each having a radial valley or low portion 163 and a radial ridge or high portion 164. There are six valleys 163 and six ridges 164, the valleys 163 being located 60° apart and the ridges 164 also being located 60° apart. The valleys 163 and ridges 164 on each side of the plate 129 are alternately disposed and between each valley 163 and ridge 164 there is an inclined surface 165. As shown in Figs. 10, 16 and 17 the valleys 163 of serrations 161 are located in the same plane as the ridges 164 of serrations 162. In this way, as is clearly shown in Figs. 16 and 17, the oppositely inclined surfaces 165 on both sides of the plate 129 are parallel. This disposition of the serrations 161 and 162 is different from the disposition of the serrations 144 and 145 of plates 127 and 128, respectively. In the latter instance, as shown in Figs. 13 and 14 and also in Figs. 16 and 17, the valleys 146 of plate 128 lie in the same plane as the valleys of plate 127 and consequently the ridges 146 of plate 128 overlie the ridges of plate 127.

A semi-circular notch 166 is formed in plate 129, said notch having a diameter corresponding substantially to the diameter of pin 130 so that said pin can be positioned in said notch during the operation of the device in the manner to be hereinafter more fully described.

As shown in Fig. 9 the center of curvature of the notch 166 is located along one of the valleys 163 of the upper surface of plate 129 and the center of curvature of the notch is disposed at a considerable distance inwardly from the annular outer edge portion of the plate 129.

Extending outwardly in opposite directions from notch 166 are arcuate peripheral surfaces 167, 168, the surface 167 being disposed on the right hand side of the notch as viewed in Figs. 3, 5 and 9, and the surface 168 being disposed on the left hand side of said notch.

A pronounced corner or shoulder 169 is formed where the surface 167 meets the notch 166 and a similar corner or shoulder 170 is formed at the inner end of surface 168. The purpose of the corners or shoulders 169 and 170 will be hereinafter more fully described.

When plate 129 is assembled on valve stem 57 and connected thereto by keys 153, and these parts are assembled in the valve with the valve plug 13 in close position, notch 166 will be located along the vertical line as shown in Figs. 19 and 20, in which position the valley 163 of serration 162 on the upper side of plate 129 together with notch 166, will be disposed at an angle of 15° to the right of the disposition of the slots 149 in plates 127 and 128. Pin 130 engages surface 168 and thus prevents rotary movement of plate 129 in the direction of the arrow in Fig. 19.

With the plates 127, 128 and 129 thus positioned relatively to each other ridges 164 of serrations 161 of plate 129 will be away from the valleys 146 of plate 127, and likewise ridges 164 of serrations 162 of plate 129 will be away from the valleys 146 of plate 128, and in this position alternate surfaces 165 on both sides of plate 129 will engage alternate surfaces 148 of plates 127 and 128, as shown in Fig. 16. It will thus be observed that when the valve plug 13 is in closed position the serrations 161 and 162 of plate 129 will be partly intermeshed, respectively, with the serrations 144 of plate 127 and serrations 145 of plate 128.

With plate 129 thus disposed relatively to plates 127 and 128, when rotary movement is imparted to plates 127 and 128 in the direction of the arrow Fig. 19, said plates will be moved with respect to plate 129, which, during such rotary movement of plates 127 and 128 does not rotate, so that the relative position of plate 129 with respect to plates 127 and 129 is shifted from the position illustrated in Fig. 16 to the position illustrated in Fig. 17 in which ridges 164 of serrations 161 of plate 129 rest on ridges 147 of the serrations 144 of plate 127, and valleys 163, ridges 164, and surfaces 165 of serrations 162 on the upper side of plate 129 respectively engage valleys 146, ridges 147, and surfaces 148 of the serrations 145 of plate 128.

In this way the relative position of plate 129 with respect to plates 127 and 128 is shifted from the intermediate or partly intermeshed position shown in Fig. 16 to the position in which serrations 161 of plate 129 are out of mesh with the serrations 144 of plate 127 and the serrations 162 of plate 129 are fully meshed with the serrations 145 of plate 128. In this way plate 129 is moved farther away from plate 127 and nearer to plate 128 for a purpose which will be hereinafter more fully described.

As shown in Fig. 2, in order to limit the above described outward movement of plate 129 with respect to plate 127, a stop 172 is provided, said stop in the present instance comprising a projection mounted in plate 128 at a point in line with the outer peripheral edge portion of plate 129. In order to adjust the position of stop 172 it is formed with a threaded shank which is mounted in a correspondingly formed opening in the plate 128. In this way the outer end of the stop can be so positioned as to engage the outer surface of plate 129 when said plate is moved outwardly in the above described manner and prevent further outward movement of said plate.

Figure 18:
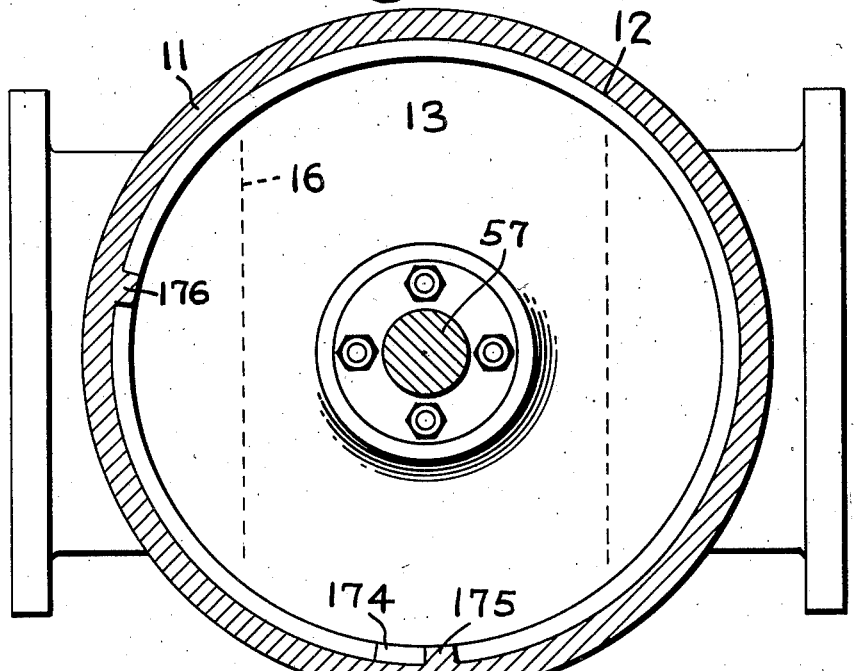
Fig. 18 is a section taken on the line 18—18 of Fig. 2 showing the stop for the plug.

Means are also provided for limiting the rotary movement of valve plug 13. As shown in Figs. 2 and 18, said plug is formed with a lug 174 which projects upwardly from the outer edge of the large end of the plug. According to the embodiment of the invention herein shown and described, the valve illustrated is a two way type of valve and the plug 13 is adapted to rotate through 90° from closed to open position and vice versa. Accordingly, the inner surface of the wall of the valve casing 11 is formed with two projections or lugs 175 and 176 which are suitably spaced apart as shown in Fig. 18. When the plug 13 is in closed position stop lug 174 thereof abuts lug 175 and when the valve plug is in open position lug 174 will engage lug 176. In this way when the plug 13 is moved from closed to open position bore 16 therein will be correctly registered with valve casing waterways 14 and 15 so that a smooth passage will extend through the valve.

Since the serrations 144 on plate 127, serrations 145 on plate 128 and serrations 161 and 162 on plate 129, constitute cam surfaces, plate 129 functions as a lifter cam which is keyed to valve stem 57, and plates 127, 128 function as rotating cams which are keyed to the rotor or piston 95. Also, fixed plates 125, 126 constitute means for guiding pin 130 so that said pin will interlock the three cams 127, 128 and 129 after the plug 13 has been unseated and disengaged said three cams at each end of 90° of rotation of the plug, allowing the plug 13 freedom of axial movement to either unseat or seat in both open and closed position.

It has been described that plates 125 and 126 are formed with openings 137 which constitute guides for pin 130, said openings being adapted to receive the rollers 136 on said pin.

In order to guide the pin 130 during operation of the device the openings 137 are formed with a specific contour which enables the pin to be guided in a predetermined path and since the outer edges of the rollers 136 engage the edges or walls of said openings, these edges constitute cam surfaces.

Referring now to Fig. 19 in which there is shown an enlarged view of one of the openings 137, it will be noted that the ends of the openings 137 are rounded as indicated at 178, 179. The major portion of the two side walls of the openings 137 which extend from the rounded portion 178 at one end to the rounded portion 179 at the other end of the openings 137 are parallel, so as to provide a snug fit for the pin rollers 136, but at certain points in the length of the openings 137 the contours of the side walls are not parallel as will be described.

Extending inwardly from the end 178, the openings 137 are slightly arcuate for a suitable distance and the side walls 180, 181 of said openings are parallel to the points 182, 183, respectively.

Likewise, extending inwardly from the end 179, the openings 137 are slightly arcuate for a suitable distance and the side walls 184 and 185 of said openings are parallel to the points 186, 187, respectively.

The side walls 188 and 189 of the intermediate portions of the openings 137 are also parallel, and these side walls are formed concentric with the center of the openings 133, 134, heretofore referred to (see Fig. 15).

As shown in Fig. 19, the side walls 188 extend through an arc of approximately 70°. At one end, the side walls 188 are formed with inwardly curved cam surfaces 190 which are joined to inwardly curved cam surfaces 191 extending from points 182 of side walls 180, pronounced shoulders 192 being formed where the surfaces 190 join surfaces 191. At their other ends, side walls 188 are formed with inwardly curved cam surfaces 193 which are joined to inwardly curved cam surfaces 194 extending from points 186 of side walls 184, pronounced shoulders 195 being formed where surfaces 193 join surfaces 194.

Between point 183 of each side wall 181 and the end of the side wall portion 189 there is a short outwardly curved cam surface 196, the center portion of which is located approximately 10° to the right of the vertical line passing through plates 125 and 126 as shown in Fig. 19. Between the other end of side wall 189 and point 187, there is a short outwardly curved cam surface 197.

During operation of the valve plug actuating mechanism the pin 130 travels from a point near the ends 178 of the openings 137 to a point near the ends 179 of said openings, and in so travelling through the openings 137 the rollers 136 of the pin engage cam surfaces 191, shoulders 192, cam surfaces 190, 188, 193, shoulders 195, and cam surfaces 194 on one side of said openings 137 and cam surfaces 181, 196, 189, 197 and 185 on the opposite side of said openings. The pin 130 is propelled through the guide openings 137 of plates 125, 126, by the plates 127, 128 which are rotated by piston 95, since the main shank or body of the pin extends through said plates 127, 128. As will be hereinafter more fully described, during the initial movement of the pin 130, the surface 168 of cam plate 129 is engaged by the intermediate portion of the pin. Continued movement of the pin 130 through the openings 137 will bring the pin into the notch 166 of cam plate 129, where said pin remains while the plug 13 is being rotated. When the pin 130 is disposed in notch 166, cam plate 129 will be interlocked with plates 127, 128 so that plate 129 will rotate with plates 127, 128. At the completion of the rotation of valve plug 13 from closed to open position, pin 130 will move out of notch 166 and engage surface 167 of plate 129, again retaining said plate in position and preventing rotation thereof.

In operation, when it is desired to open the valve, plug 113 of control valve 108 is turned from the position shown in Fig. 3 to the position shown in Fig. 4. This action connects piston chambers 103 and 105 with the sewer pipe 117, through pipe 107, port 110, passage 114, and port 111, so that the pressure of the fluid in said chambers is relieved, and simultaneously connects piston chambers 102 and 104 with the supply of fluid under pressure, from pipe 116, through port 109, passage 115, port 112, and pipe 106 (see Figs. 3 and 4).

Fluid under pressure supplied to piston chambers 102 and 104, acting on the movable abutments provided by piston arms 96 and 97, will rotate the piston 95 in the direction of the arrow, Fig. 3, and said piston will be moved from the position shown in Fig. 3 to the position shown in Fig. 5. In Fig. 3 piston arm 96 is shown disposed adjacent fixed abutment 99, and piston arm 97 is shown disposed adjacent fixed abutment 100. In Fig. 5 piston arm 96 is shown adjacent fixed abutment 100, and piston arm 97 is shown adjacent fixed abutment 99. In the embodiment of the invention herein illustrated the piston 95 rotates through an arc of approximately 120°, and since cam plates 127, 128 are fixed to said piston, said cam plates will also be rotated the same amount as is piston 95.

During approximately the first 15° movement of piston 95, the valve plug 13 is unseated and this action is effected in the manner to be next described.

It has been heretofore explained that pin 130 engages surface 168 of cam plate 129. When the rotation of piston 95 is initiated, cam plates 127, 128, acting on the shank of pin 130, tend to move said pin along with them in a clockwise direction (see arrow in Fig. 19). However, since pin 130 is guided by the openings 137 in fixed plates 125, 126, said pin will be caused to move inwardly and downwardly, due to the inclination of the side walls 180, 181 of the portion of the pin guide openings 137 in which the pin 130 is disposed. As shown in Fig. 19 surface 168 parallels side wall 180 and therefore the pin will also move along surface 168 of cam 129.

During the initial movement of piston 95, cam plate 129 remains stationary since there are no means connecting or interlocking said plate with cam plates 127 and 128, but cam plates 127 and 128 rotate and in so doing the lower cam plate 127 slides radially on the lower surface of cam plate 129, thereby imparting a straight line axial movement to cam plate 129, valve stem 57 and plug 13, so as to unseat said plug. This axial movement is the result of inclined surfaces 165 of the serrations 162 of cam plate 129 moving up the inclined surfaces 148 of the serrations 145 of cam plate 128 and the inclined surfaces of the serrations 161 of cam plate 129 moving up the inclined surfaces of the serrations 144 of cam plate 127 until the ridges 164 rest upon the ridges 147 as shown in Fig. 17.

Since the valve stem 57 is connected to cam plate 129 in the manner heretofore described, movement of the cam plate 129 towards cam plate 128 will cause plate 129 to urge sleeve 155 outwardly with it, and this axial movement of the sleeve is transmitted through collar 157 to valve stem 57 so that said valve stem is also moved axially a corresponding distance, thereby axially moving the plug 13 and unseating the same. Due to the inclination of the side walls of the valve body 11 and plug 13, only a slight axial movement of the plug is required to unseat the plug and permit the same to rotate freely in the cavity 12.

Fig. 7 illustrates the position of the parts when the valve plug 13 is closed and seated and Fig. 8 illustrates the position of the same parts when the piston 95 has been rotated sufficiently to unseat the plug and partly rotate the same (see Fig. 22).

During the rotary movement of cam plates 127, 128 relative to cam plate 129 which takes place during the first 15° rotation of piston 95, pin 130 will move down surface 168 of cam plate 129 towards the notch 166, and when the cam plates 127, 128 have been rotated approximately 15°, pin 130 will be disposed in the notch 166 with the side of said pin abutting shoulder 169 of cam plate 129. The parts will then be positioned as illustrated in Fig. 21.

When pin 130 engages shoulder 169 continued or further movement of piston 95 and cam plates 127, 128 carrier by said piston will result in a corresponding movement being imparted to cam plate 129, and consequently, since the valve stem 57 is keyed to plate 129, the plug 13 will also be rotated.

When pin 130 moves into engagement with shoulder 169, cam surface 191 of the pin guide opening 137 of fixed plates 125, 126 will prevent the pin from dropping down into the bottom of the notch 166. However, as soon as the cam plate 129 moves along with cam plates 127, 128 and piston 95, due to forces exerted against shoulder 169 by pin 130, said pin will ride over shoulder 192 and roll down surface 190 towards side wall 188, and this movement permits the pin to drop into the bottom of notch 166 and interlocks cam plate 129 with cam plates 127, 128.

As shown in Fig. 19, side walls 188, 189 of the pin guide openings 137 are concentric with the center of shaft 57, and consequently during further rotation of piston 95 and cam plates 127, 128 and 129 the pin 130 will be so guided that said pin will remain disposed in the notch 166 of cam plate 129 throughout the travel of pin 130 along side walls 188, 189 of the pin guide openings 137 (see Fig. 22).

As has been previously described, valve plug 13 is adapted, in the present instance, to rotate through an angle of 90° from closed to open position, and said plug carries a lug 174 which is adapted to engage stop lugs 175, 176, respectively.

When the plug 13 has been rotated, in the above described manner, through the interlocking of cam plate 129 with cam plates 127, 128 of the operating mechanism, through an angle of 90° lug 174 of the plug 13 strikes stop lug 176 (see Fig. 18) and further rotation of the plug 13 is prevented.

When lug 174 engages stop lug 176, pin 130 has been partly moved out of notch 166 due to camming action of cam surface 193 of the pin guide openings 137 of plates 125, 126. This camming action will cause the pin 130 to ride up over shoulder 169 (see Fig. 23) and during continued rotary movement of piston 95 and cam plates 127, 128 said pin engages the arcuate surface 167 of plate 129, as shown in Fig. 24, and in so doing permits said cam plate 129 to remain stationary.

When the pin 130 is removed from notch 166 in the manner just described the interlock between cam plates 127, 128 and cam plate 129 is broken, and this action takes place when the valve plug 13 has been rotated to its wide open position.

Since piston 95 and cam plates 127, 128 continue to rotate after the valve plug 13 has been turned to its fully opened position, cam plates 127, 128 will continue to move relatively to cam plate 129 which is now stationary and this movement of cam plates 127, 128 relative to the non-rotating cam plate 129 permits the serrations 161, 162 of cam plate 129 to respectively move down serrations 144 of cam plate 127 and serrations 145 of cam plate 128, whereby cam plate 129 is shifted from the position shown in Fig. 17 to the position shown in Fig. 16 and this action causes a corresponding axial movement of valve stem 57 so that valve plug 13 is again moved downwardly of the casing and seated.

From the foregoing it will be noted that during the initial rotary movement of piston 95 from the position shown in Fig. 3 to the position shown in Fig. 5, the valve plug 13 is unseated, that during the intermediate rotary movement of said piston, the valve plug is turned from closed to open position, and that during the final portion of the rotary movement of said piston the valve plug is reseated. This action is effected by first rotating the piston with said piston uncoupled from the valve stem, then automatically coupling the piston to the valve stem so that the valve plug will turn together with the piston, and then automatically uncoupling the piston from the valve stem so that said piston can continue to rotate without imparting further rotation to the valve plug. It will be further noted that means are provided for moving the valve stem axially of the valve casing through means operated by the rotating piston in cooperation with non-rotating means operatively connected to said valve stem so as to effect the unseating and reseating of the valve plug during the periods the rotating piston is uncoupled from the valve stem.

In order to close the valve plug 13 the reverse operation of the parts occurs. First, control valve 108 is actuated so as to move its plug 113 from the position shown in Fig. 4, to the position shown in Fig. 3, in which fluid under pressure in piston chambers 102 and 104 is vented to the sewer through pipe 106, port 112, passage 115, port 111 and pipe 117, and fluid under pressure is supplied to piston chambers 103 and 105, through pipe 116, port 109, passage 114, port 110 and pipe 107.

With fluid under pressure thus supplied to piston chambers 103 and 105 piston 95 will be rotated in a counterclockwise direction so that arms 96 and 97 thereof are moved through an angle of approximately 120° from their respective positions shown in Fig. 5 to their positions shown in Fig. 3.

During the first 15° rotation of piston 95, the plug 13 will be unseated as the result of the lower cam plate 127 sliding radially on the lower cam surface 161 of cam plate 129 to effect straight line axial movement of the cam plate 129, valve stem 57 and plug 13 in the manner heretofore described.

During the next 90° rotation of piston 95 the plug 13 will be turned from its open to its closed position, on account of the interlocking of cam plate 129 with cam plates 127, 128, resulting from the pin 130 being disposed in notch 166 of cam plate 129.

When the plug 13 has been turned 90° lug 174 thereof will engage stop lug 175 (see Fig. 18) so that further rotation of said plug is prevented, and simultaneously pin 130 will be disengaged from notch 166 thereby uncoupling cam plate 129 from cam plates 127, 128, so that during the final 15° rotation of piston 95 cam plates 127 and 128 will slide radially on the cam surfaces of plate 129 thereby forcing cam plate 129, valve stem 57 and plug 13 in a straight line axially to reseat said plug 13. At the end of the last 15° rotation of piston 95 the parts will be restored to their respective positions as shown in Figs. 1, 2, 3, 16, 18, 19, and 20.

Having thus described my invention what I claim is:

1. In a valve structure, the combination of a valve body having a passage therethrough and a valve seat, a ported plug in said body cooperating with said valve seat and movable to open and to close said passage, a casing directly associated with the valve body, operating means therein including a rotatable fluid operated piston adapted to be rotated through an angle in excess of the turning angle of the valve plug, and means within said piston and actuated by said piston for axially moving said valve plug in a straight line during the portions of the rotation of the piston in which the valve plug is not rotated.

2. In a valve structure, the combination of a valve body having a passage therethrough and a valve seat, a ported plug in said body cooperating with said valve seat and rotatable to open and close said passage, a casing directly associated with the valve body, operating mechanism for the valve plug including a fluid pressure operated rotor, means therein for rotating the rotor through an angle in excess of the turning angle of the plug, means for axially moving the plug in a straight line during a period at the beginning of the rotary movement of the rotor to unseat the plug and during a period at the end of the rotary movement of the rotor to reseat the plug, means for rotating the plug during the intermediate period of the rotary movement of the rotor, means for maintaining the plug rotating means uncoupled from the rotor during the periods of rotation of the rotor the plug is moved axially in a straight line, and means including a pin parallel to axis of rotation of said plug for interlocking the plug rotating means with the plug axially moving means during the intermediate period of rotation of the rotor.

3. The combination in a valve of the type described, of a rotary taper plug and its complemental valve body, means for operating the plug comprising a fluid pressure operated piston rotatable through an angle in excess of the turning angle of the plug, means within and operated by the piston at the beginning of the piston movement for moving the plug axially in a straight line for relieving the wedging action of the plug, means for interlocking said piston with the plug during the intermediate period of rotation of said piston so that said plug turns with the piston, means for uncoupling the plug from the piston at the end of the turning movement of the plug, and means operated by said piston after the plug has been turned and during continued rotary movement of said piston for moving the plug axially in a straight line to rewedge the plug in the casing.

4. In a valve structure, the combination of a casing having a passage therethrough and a plug seat, a plug in said casing cooperating with said seat and movable to open and to close said passage, a stem extending from said plug and journalled in said casing, operating means for said plug comprising means adapted to first move said plug and the stem carried thereby axially in a straight line to unseat the plug, then to rotate said plug through a predetermined angle, and then to move said plug and the stem carried thereby axially in a straight line to reseat the plug, means carried by the stem and disposed on the exterior of the valve casing for indicating the relative position of said plug, and means carried by the casing and interlocked with said indicating means for preventing axial movement of said indicating means with respect to the casing when said stem is axially moved, said interlocking means permitting rotation of said indicating means.

5. A valve structure comprising a casing, a plug mounted in said casing for axial and rotary movement, an operating stem projecting from one end of the plug, mechanism for operating said plug, said mechanism being operatively connected with said stem, a housing detachably secured to said casing for enclosing said mechanism, the housing and the mechanism being removable as a unit from the casing, a hollow trunnion projecting from the end of said plug opposite to said stem, a tubular spindle detachably mounted in said casing and having its inner end mounted in said hollow trunnion for supporting the plug, a stem extending through said spindle and threaded at both ends, one end of said stem being secured to the plug and the opposite end of said stem projecting beyond said casing, and a nut on the outer end of said stem for drawing said plug down tightly on its seat when the housing is removed from the casing.

6. In a valve structure, the combination of a valve body having a passage therethrough and a valve seat, a ported plug in said valve body cooperating with said valve seat and rotatable to open and close said passage, a casing directly associated with the valve body, a fluid pressure operated rotatable piston within said casing and adapted to be rotated through an angle in excess of the turning angle of the valve plug, means within said piston for moving the valve plug axially in a straight line during a portion of the rotation of said piston to first move said plug away from its seat and then towards its seat and means within said piston and operative during the portion of rotation of said piston in which the valve plug is not axially moved for rotating the valve plug through a predetermined angle.

7. In a valve structure, the combination of a valve body having a passage therethrough and a plug seat, a plug in said valve body cooperating with said seat and movable to open and to close said passage, a cylinder, a rotary piston in said cylinder adapted to be rotated through an angle in excess of the turning angle of said plug, the piston being provided with an annular body and a pair of diametrically disposed arms projecting outwardly therefrom and engaging the wall of said cylinder, a pair of diametrically disposed fixed arms mounted in said cylinder and interposed between said piston arms, said fixed arms engaging the annular body of said piston, chambers formed in said cylinder between said arms, means connecting alternate chambers in pairs, means for controlling communicating through said chamber connecting means whereby fluid under pressure can be supplied to each pair of connected chambers for alternately operating said piston in opposite directions, said plug having a stem extending axially through said piston, a pair of cam plates within the inner portion of said annular body, and a cam plate fixed to said stem interposed between the pair of plates whereby said plug is raised, turned and reseated in a substantially straight line.

8. The combination in a valve of the type described, of a rotary tapered plug having a stem and a complemental body, means for operating the plug comprising a casing on the body having a chamber, a piston therein rotatable through an angle in excess of the turning angle of the plug, means within and operated by the piston at the beginning of the piston movement for moving the plug axially in a straight line for relieving the wedging action of the plug, means for interlocking said piston with the plug during the intermediate period of rotation of said piston so that said plug turns with said piston, means for uncoupling the plug from the piston at the end of the turning movement of the plug comprising a stop lug formed on the valve body and a stop lug formed on said plug and adapted to engage the body stop lug when the plug has been turned a predetermined amount, and means operated by said piston after the plug has been turned and during continued rotary movement of said piston for moving the plug axially in a straight line to rewedge the plug in the valve body.

9. In a valve structure, the combination of a valve body having a passage therethrough and a seat, a plug in said body cooperating with said seat and movable to open and to close said passage, a lug formed on the plug, a pair of lugs formed on the body and projecting into the path of the lug formed on the plug, the plug lug being adapted to engage one of said body lugs when the valve is closed and to engage the other body lug when the valve is open, a casing above the body having a chamber, and actuating means therein for rotating the plug, said actuating means comprising a piston and mechanism within and operated by said piston to first move said plug bodily axially in a straight line away from said seat, then to turn said plug, and then to move said plug axially toward said seat in a substantially straight line, the plug turning means being interlocked with said piston through a predetermined angle of rotation of said piston in which the plug stop lug is moved from one of the stop lugs on the body to the other stop lug on the body, said plug turning means being automatically unlocked from said piston when the turning movement of the plug is arrested by the plug stop lug engaging a stop lug on the casing.

10. A valve actuating means for a plug valve of the type adapted to be raised, turned and reseated, comprising a fluid pressure motor with means for controlling the same to turn the valve plug in alternate directions, and means within the motor comprising cam plates for producing the raising and reseating of the valve plug, before and after the same is turned.

11. A valve actuating means for a plug valve of the type adapted to be raised, turned and reseated, comprising a fluid pressure motor with means for controlling the same to turn the plug in alternate directions to operate said valve, and means within the motor comprising cam plates adapted to be interlocked during operation of said motor for producing the raising and reseating of the plug before and after the same is turned.

12. A valve actuating means for a tapered plug valve of the type adapted to be raised, turned and reseated, comprising a casing directly associated with valve, a chamber formed in said casing, a fluid pressure motor within said chamber, external means for controlling the fluid entering and leaving the motor to alternately turn the valve plug into open or closed position, and means within the motor comprising cam plates for producing the raising and reseating of the valve plug before and after said plug is turned.

13. A valve actuating means for a tapered plug valve of the type adapted to be raised, turned and reseated, comprising a casing directly associated with the valve and having a chamber, a fluid pressure motor within said chamber, external means for controlling the fluid entering and leaving the motor to alternately turn the plug of the valve into open or closed position, and means within the motor comprising cam plates adapted to be interlocked during operation of said motor for producing the raising and reseating of the valve plug before and after said plug is turned.

14. A valve actuating means for a tapered plug valve of the type adapted to be raised, turned and reseated, comprising a casing directly associated with the valve, a chamber formed in said casing, a fluid pressure motor within said chamber, external means for controlling the fluid entering and leaving the motor to alternately turn the valve plug into open or closed position, a stem projecting from the valve plug and passing centrally through said motor, and means within the motor comprising a pair of cam plates and a plate secured to the stem of the valve plug whereby the plug is raised prior to the turning of the plug and reseated after the plug has been turned the desired amount.

15. A valve actuating means for a tapered plug valve of the type adapted to be raised, turned and reseated, comprising a casing directly associated with the valve and having a chamber formed therein, a fluid pressure motor within said chamber, external means for controlling the fluid entering and leaving the motor to alternately turn said motor in opposite directions to open or close the valve, a stem projecting from the valve plug and passing through the motor, a pair of cam plates within said motor and encircling said valve stem, a plate secured to the stem of the valve and operatively engaging said pair of cam plates whereby the plug is raised prior to turning and reseated after the same has been turned the desired amount.

16. A valve actuating means for a tapered plug valve of the type adapted to be raised, turned and reseated, comprising a casing directly associated with the valve and having a chamber formed therein, a fluid pressure motor within said chamber, external means for controlling the fluid entering and leaving the motor to alternately turn the motor in opposite directions to open or close the valve, a stem projecting from the valve plug and extending through the motor, a pair of cam plates within said motor and encircling said valve stem, and a plate secured to the stem of the valve and having cam surfaces for engaging said pair of cam plates, whereby the plug is raised prior to turning and reseated after the same has been turned the desired amount.

17. A tapered plug valve with complementary valve body, and actuating means for said valve, comprising a casing having an expansion chamber therein and an oscillating piston in said chamber, said piston including a pair of cam plates, a stem projecting from the valve plug and extending through said piston, and a cam plate on said stem cooperating with said first mentioned cam plates whereby the valve plug may be raised, turned and reseated.

18. A tapered plug valve with complementary valve body, and actuating means for said valve comprising a casing having an expansion chamber therein and an oscillating piston in said chamber, an opening formed centrally through said piston, a pair of cam plates mounted within said piston opening, a stem projecting from the valve plug and extending through said cam plates, a cam plate on said stem cooperating with said first mentioned cam plates, slotted plates within the piston opening and fixed to said casing, and a pin carried by said slotted plates for interlocking all of said cam plates together whereby the valve plug may be raised, turned and reseated.

19. In a valve structure, the combination of a valve body having a passage therethrough and a valve seat, a tapered ported plug in said body cooperating with said valve seat and movable to open and to close said passage, a casing on said body having a chamber, operating means therein for said plug including a rotatable fluid operated piston adapted to be rotated through a total angle of approximately 120°, and means within said piston and operated by said piston during the rotary movement thereof through a relatively small angle for moving said plug axially in a straight line away from its seat, then during continued rotary movement of said piston through an angle of approximately 90° for rotating said plug to open or close said passage, and then during the rotary movement of said piston through a still further relatively small angle for moving said plug axially toward its seat in a substantially straight line.

20. In a valve structure, the combination of a valve body having a passage therethrough and a plug seat, a tapered ported plug in said body cooperating with said seat and movable to open and to close said passage, a casing on said body having a chamber, operating means within said chamber for said plug, said operating means including a rotatable fluid operated piston adapted to be rotated through a total angle in excess of the turning angle of the valve plug, and means within said piston and operated by said piston during the rotary movement thereof through a relatively small angle for moving said plug axially in a straight line away from its seat, then during continued rotary movement of said piston for rotating said plug to open and close said passage, and then during further rotary movement of said piston through a relatively small angle for moving said plug axially toward its seat in a substantially straight line.

EUGENE C. BRISBANE.